(12) United States Patent
Yoshida et al.

(10) Patent No.: US 12,034,862 B2
(45) Date of Patent: Jul. 9, 2024

(54) ANONYMOUS BROADCAST METHOD, KEY EXCHANGE METHOD, ANONYMOUS BROADCAST SYSTEM, KEY EXCHANGE SYSTEM, COMMUNICATION DEVICE, AND PROGRAM

(71) Applicant: NIPPON TELEGRAPH AND TELEPHONE CORPORATION, Chiyoda-ku (JP)

(72) Inventors: Reo Yoshida, Musashino (JP); Tetsutaro Kobayashi, Musashino (JP); Yuto Kawahara, Musashino (JP); Hitoshi Fuji, Musashino (JP); Kazuki Yoneyama, Hitachi (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 17/852,745

(22) Filed: Jun. 29, 2022

(65) Prior Publication Data

US 2022/0337428 A1    Oct. 20, 2022

Related U.S. Application Data

(62) Division of application No. 16/641,716, filed as application No. PCT/JP2018/030281 on Aug. 14, 2018.

(30) Foreign Application Priority Data

Sep. 5, 2017  (JP) .................................. 2017-170072

(51) Int. Cl.
*H04L 29/06* (2006.01)
*H04L 9/08* (2006.01)
(Continued)

(52) U.S. Cl.
CPC .......... *H04L 9/3247* (2013.01); *H04L 9/0869* (2013.01); *H04L 9/30* (2013.01)

(58) Field of Classification Search
CPC ....... H04L 9/3247; H04L 9/0869; H04L 9/30; H04L 2209/601; H04L 9/3073;
(Continued)

(56) References Cited

FOREIGN PATENT DOCUMENTS

WO    WO 2016/016656 A1    2/2016

OTHER PUBLICATIONS

International Search Report issued on Nov. 20, 2018 in PCT/JP2018/030281 filed on Aug. 14, 2018.
(Continued)

*Primary Examiner* — Wasika Nipa
*Assistant Examiner* — Leynna Truvan
(74) *Attorney, Agent, or Firm* — Oblon, McClelland, Maier & Neustadt, L.L.P.

(57) ABSTRACT

A key exchange technique of performing a key exchange among N ($\geq 2$) parties, which can conceal metadata on communication, is provided. A key exchange method includes: a first key generation step in which a communication device $U_i$ generates a first key; a first anonymous broadcast step in which the communication device $U_i$ anonymously broadcasts the first key with a set $R-\{U_i\}$ being designated for $i \in \{1, \ldots, n\}$ and the communication device $U_i$ anonymously broadcasts the first key with $\varphi$ being designated for $i \in \{n+1, \ldots, N\}$; a second key generation step in which the communication device $U_i$ generates a second key; a second anonymous broadcast step in which the communication device $U_i$ anonymously broadcasts the second key with the set $R-\{U_i\}$ being designated for $i \in \{1, \ldots, n\}$ and the communication device $U_i$ anonymously broadcasts the second key with $\varphi$ being designated for $i \in \{n+1, \ldots, N\}$; and a session key generation step in which
(Continued)

the communication device $U_i$ generates a session key SK for $i \in \{1, \ldots, n\}$ if a predetermined condition is satisfied.

4 Claims, 7 Drawing Sheets

(51) Int. Cl.
  *H04L 9/30* (2006.01)
  *H04L 9/32* (2006.01)
(58) Field of Classification Search
  CPC ... H04L 9/0841; H04L 9/0816; H04L 9/0838; H04L 9/06; H04L 9/0643; H04L 9/28; H04L 9/3236; H04L 9/3242; H04L 9/3244; H04L 67/1065; H04L 29/06714; H04L 2209/26; H04L 63/061; H04L 29/08621; H04L 63/0442; H04L 63/0478; H04L 5/0025; H04L 29/06863; H04L 63/123; H04L 2209/061; H04W 12/04031; H04W 12/04033; H04W 12/041; H04W 12/0471; H04W 88/23; H04M 2215/0156; G05B 2219/31206; G05B 2219/25111; G05B 21/0222; G05B 2219/32333; G05B 2219/33003; H04N 21/4623; H04N 21/2351; H04H 20/00; H04H 20/38; G01R 31/3648; G06F 16/137; G06F 16/152; G06F 7/58; G06F 7/582; G06F 7/588; G07B 2017/00782; G01D 5/2495; G06Q 20/3827
  See application file for complete search history.

(56) References Cited

OTHER PUBLICATIONS

Lazar et al., "Alpenhorn: Bootstrapping Secure Communication without Leaking Metadata", Extended Technical Report (version Oct. 26, 2016), [online], <URL:https://vuvuzela.io/alpenhorn-extended.pdf>, pp. 1-17.
Goldreich, "Modern Cryptography, Probabilistic Proofs and Pseudorandomness", Springer-Verlag Tokyo Inc., 2001, 3 pages (with English translation).
Buchmann, "Introduction to Cryptography The original $3^{rd}$ edition", Maruzen Publishing Co. Ltd, 2007, 10 pages (with English translation).
Yoneyama, "One-Round Authenticated Key Exchange with Strong Forward Secrecy in the Standard Model against Constrained Adversary", IEICE Trans. Fundamentals, vol. E96-A, No. 6, Jun. 2013, pp. 1124-1138.
Ohkubo et al., "A Length-Invariant Hybrid Mix", ASIACRYPT'00, Proceeding of the $6^{th}$ International Conference on the Theory and Application of Cryptology and Information Security: Advances in Cryptology, 2000, pp. 178-191.
He et al., "Anonymous Identity-Based Broadcast Encryption with Chosen-Ciphertext Security", ASIA CCS'16, Proceedings of the $11^{th}$ ACM on Asia Conference on Computer and Communications Security, 2016, pp. 247-255.
Zhiguo Wan, et al., "Anonymous ID-Based Group Key Agreement for Wireless Networks" IEEE, Wireless Communications and Networking Conference, XP031244044, Mar. 31, 2008, pp. 2615-2620.

ANONYMOUS BROADCAST METHOD, KEY EXCHANGE METHOD, ANONYMOUS BROADCAST SYSTEM, KEY EXCHANGE SYSTEM, COMMUNICATION DEVICE, AND PROGRAM

CROSS-REFERENCE TO RELATED APPLICATIONS

This application is a division of and claims the benefit of priority under 35 U.S.C. § 120 from U.S. application Ser. No. 16/641,716 filed Feb. 25, 2020, there entire contents of which are incorporated herein by reference. U.S. application Ser. No. 16/641,716 is a National Stage of PCT/JP2018/030281 filed Aug. 14, 2018, which claims the benefit for priority under 35 U.S.C. § 119 from Japan Application No. 2017-170072 filed Sep. 5, 2017.

TECHNICAL FIELD

This invention relates to applications of information security technologies and, in particular, relates to a key exchange technique that allows a plurality of users, who make up a group, to share a common key.

BACKGROUND ART

A key exchange technique that allows a plurality of users, who make up a group, to share a common key has been proposed. An example of a system that implements such a key exchange technique is shown in FIG. 1. A key exchange system 90 includes a key exchange server 700 and N (≥2) communication devices $800_1, \ldots, 800_N$. In this embodiment, the key exchange server 700 and the communication devices $800_1, \ldots, 800_N$ are each connected to a communication network 900 and each communication device $800_i$ exchanges keys with another communication device $800_j$ via the key exchange server 700 (1≤i, j≤N; i and j differ from each other). However, there is a problem in that, due to a key exchange that is needed to ensure the confidentiality of communication, metadata on communication, such as metadata on when and how frequently which communication device communicates with which communication device, is leaked to an outside attacker, which makes it difficult to conceal the metadata completely. For example, in a key exchange using a public key infrastructure (PKI), an attacker finds that a user who got a public key wants to communicate with a user who is an owner of the public key.

Therefore, a protocol in Non-patent Literature 1 has been proposed as a key exchange technique that can conceal metadata. The technique of Non-patent Literature 1 implements a key exchange between two parties using probabilistic public key encryption in the communication channel. This makes it possible to conceal metadata (for instance, a telephone number, a destination, a source, communication time, a communication path, an attached file name, and the number of transmissions) on communication at the time of a key exchange between two parties.

PRIOR ART LITERATURE

Non-Patent Literature

Non-patent Literature 1: David Lazar and Nickolai Zeldovich, "Alpenhorn: Bootstrapping Secure Communication without Leaking Metadata", [online], [searched on Jul. 14, 2017], the Internet <URL:https://vuvuzela.io/alpenhorn-extended.pdf>

SUMMARY OF THE INVENTION

Problems to be Solved by the Invention

However, in the technique of Non-patent Literature 1, users who can exchange a common key are limited to two parties. This makes it impossible to implement a key exchange with metadata being concealed in communication among N (≥3) parties.

An object of the present invention is accordingly to provide a key exchange technique of performing a key exchange among N (≥2) parties, which can conceal metadata on communication.

Means to Solve the Problems

An aspect of the present invention is an anonymous broadcast method in which N is assumed to be an integer greater than or equal to 2, L is assumed to be an integer greater than or equal to 1, and the anonymous broadcast method allows communication devices of N communication devices $U_1, \ldots, U_N$, the communication devices included in a set R of communication devices={$U_1, \ldots, U_n$} (2≤n≤N), to share messages $M_1, \ldots, M_n$. $ID_i$ (1≤i≤N) is assumed to be an identifier of a communication device $U_i$, $MPK_j$ (1≤j≤L) is assumed to be a master public key of an anonymous ID-based broadcast encryption scheme, $SMPK_j$ (1≤j≤L) is assumed to be a master public key of an ID-based signature scheme, $dk_i^{(j)}$ (1≤i≤N, 1≤j≤L) is assumed to be a decryption key of the anonymous ID-based broadcast encryption scheme, and $sk_i^{(j)}$ (1≤i≤N 1≤j≤L) is assumed to be a signature key of the ID-based signature scheme. The anonymous broadcast method includes: a cipher text generation step in which, for i∈{1, …, n}, the communication device $U_i$ generates a signature $\omega_i \leftarrow (\Sigma_{j=1, \ldots, L} SMPK_j, \Sigma_{j=1, \ldots, L} sk_i^{(j)}, (ID_i, M_i))$ from a master public key $\Sigma_{j=1, \ldots, L} SMPK_j$, a signature key $\Sigma_{j=1, \ldots, L} sk_i^{(j)}$, and a message $(ID_i, M_i)$ which is a tuple of the identifier $ID_i$ and a message $M_i$ and generates cipher text $C_i \leftarrow (\Sigma_{j=1, \ldots, L} MPK_j, (ID_i, \omega_i, M_i), (R-\{U_i\}))$ from a master public key $\Sigma_{j=1, \ldots, L} MPK_j$, plaintext $(ID_i, \omega_i, M_i)$ which is a tuple of the identifier $ID_i$, the signature $\omega_i$, and the message $M_i$, and a set $R-\{U_i\}$ and, for i∈{n+1, …, N}, the communication device $U_i$ generates cipher text $C_i$ which is a dummy message; a cipher text obtaining step in which, for i∈{1, …, N}, the communication device $U_i$ obtains cipher text $\{C_1, \ldots, C_N\}$ obtained by a shuffle performed by a mix-net; and a message reconstruction step in which, for i∈{1, …, N}, the communication device $U_i$ generates a message $(ID_k, \omega_k, M_k) \leftarrow (\Sigma_{j=1, \ldots, L} dk_i^{(j)}, C_k)$ from a decryption key $\Sigma_{j=1, \ldots, L} dk_i^{(j)}$ and cipher text $C_k$ (1≤k≤N) and, if $U_i \in R-\{U_k\}$, generates a verification result $Ver_k \leftarrow (\Sigma_{j=1, \ldots, L} SMPK_j, ID_k, M_k, \omega_k)$ from the master public key $\Sigma_{j=1, \ldots, L} SMPK_j$ and the message $(ID_k, \omega_k, M_k)$, and, if a signature $\omega_k$ is successfully verified, regards a message $M_k$ as a message transmitted from a communication device $U_k$ with an identifier $ID_k$ and the communication device $U_i \in R$ obtains the messages $M_1, \ldots, M_n$.

An aspect of the present invention is a key exchange method in which N is assumed to be an integer greater than or equal to 2, L is assumed to be an integer greater than or equal to 1, and the key exchange method allows communication devices of N communication devices $U_1, \ldots, U_N$, the communication devices included in a set R of communication devices=$\{U_1, \ldots, U_n\}$ ($2 \leq n \leq N$), to share a session key SK. $ID_i$ ($1 \leq i \leq N$) is assumed to be an identifier of a communication device $U_i$, $MPK_j$ ($1 \leq j \leq L$) is assumed to be a master public key of an anonymous ID-based broadcast encryption scheme, $SMPK_j$ ($1 \leq j \leq L$) is assumed to be a master public key of an ID-based signature scheme, $dk_i^{(j)}$ ($1 \leq i \leq N$, $1 \leq j \leq L$) is assumed to be a decryption key of the anonymous ID-based broadcast encryption scheme, $sk_i^{(j)}$ ($1 \leq i \leq N$, $1 \leq j \leq L$) is assumed to be a signature key of the ID-based signature scheme, G is assumed to be a finite cyclic group of prime number order p with generators g and h, ∥ is assumed to be a concatenation operator, and secret strings $st_i$ and $st'_i$ are recorded on a recording unit of the communication device $U_i$ ($1 \leq i \leq N$). The key exchange method includes: a first key generation step in which, for $i \in \{1, \ldots, n\}$, the communication device $U_i$ calculates $r_i$, $k_i$, and $s_i$ using the secret strings $st_i$ and $st'_i$ by a twisted pseudo-random function and generates a first key ($R_i$, $c_i$) by calculating $R_i = g^{r_i}$ and $c_i = g^{k_i} h^{s_i}$ and, for $i \in \{n+1, \ldots, N\}$, the communication device $U_i$ randomly selects $R_i$, $c_i \in_R G$ and generates a first key ($R_i$, $c_i$); a first anonymous broadcast step in which, for $i \in \{1, \ldots, n\}$, the communication device $U_i$ anonymously broadcasts the first key ($R_i$, $c_i$) with a set $R-\{U_i\}$ being designated and, for $i \in \{n+1, \ldots, N\}$, the communication device $U_i$ anonymously broadcasts the first key ($R_i$, $c_i$) with $\varphi$, which means no recipient, being designated; a second key generation step in which, for $i \in \{2, \ldots, n\}$, the communication device $U_i$ calculates a session ID sid using $c_k$ ($1 \leq k \leq n$) by a target-collision resistant hash function, calculates $K_i^{(l)}$ using (sid, $R_{i-1}^{r_i}$) by a pseudo-random function, calculates $K_i^{(r)}$ using (sid, $R_{i+1}^{r_i}$) by a pseudo-random function, calculates $T_i$ by an exclusive OR of $K_i^{(l)}$ and $K_i^{(r)}$, randomly selects $T'_i \in_R Z_p^2$, generates a signature $\sigma_i \leftarrow (\Sigma_{j=1, \ldots, L} SMPK_j, \Sigma_{j=1, \ldots, L} sk_i^{(j)}, (R, R_i, c_i, k_i, s_i, T_i, T'_i))$ from a master public key $\Sigma_{j=1, \ldots, L} SMPK_j$, a signature key $\Sigma_{j=1, \ldots, L} sk_i^{(j)}$, and a message ($R, R_i, c_i, k_i, s_i, T_i, T'_i$), and generates a second key ($k_i, s_i, T_i, T'_i, \sigma_i$), for i=1, a communication device $U_1$ calculates a session ID sid from $c_k$ ($1 \leq k \leq n$) by a target-collision resistant hash function, calculates $K_1^{(l)}$ using (sid, $R_n^{r_1}$) by a pseudo-random function, calculates $K_1^{(r)}$ using (sid, $R_2^{r_1}$) by a pseudo-random function, calculates $T_1$ by an exclusive OR of $K_1^{(l)}$ and $K_1^{(r)}$, calculates $T'$ by an exclusive OR of $K_1^{(l)}$ and $k_1 \| s_1$, randomly selects $k''_1, s''_1 \in_R Z_p$, generates a signature $\sigma_1 \leftarrow (\Sigma_{j=1, \ldots, L} SMPK_j, \Sigma_{j=1, \ldots, L} sk_1^{(j)}, (R, R_1, c_1, k''_1, s''_1, T_1, T'))$ from the master public key $\Sigma_{j=1, \ldots, L} SMPK_j$, a signature key $\Sigma_{j=1, \ldots, L} sk_1^{(j)}$, and a message ($R, R_1, c_1, k''_1, s''_1, T_1, T'$), and generates a second key ($k''_1, s''_1, T_1, T', \sigma_1$), and, for $i \in \{n+1, \ldots, N\}$, the communication device $U_i$ randomly selects $k_i, s_i \in_R Z_p$, $T_i, T'_i \in_R Z_p^2$, and $\sigma_i \in_R \Sigma$ (where $\Sigma$ is a signature space) and generates a second key ($k_i, s_i, T_i, T'_i, \sigma_i$); a second anonymous broadcast step in which, for $i \in \{2, \ldots, n\}$, the communication device $U_i$ anonymously broadcasts the second key ($k_i, s_i, T_i, T'_i, \sigma_i$) with the set $R-\{U_i\}$ being designated, for i=1, the communication device $U_1$ anonymously broadcasts the second key ($k''_1, s''_1, T_1, T', \sigma_1$) with a set $R-\{U_1\}$ being designated, and, for $i \in \{n+1, \ldots, N\}$, the communication device $U_i$ anonymously broadcasts the second key ($k_i, s_i, T_i, T'_i, \sigma_i$) with the $\varphi$ being designated; and a session key generation step in which, for $i \in \{2, \ldots, n\}$, when the communication device $U_i$ obtains the second key ($k''_1, s''_1, T_1, T', \sigma_1$) and a second key ($k_k, s_k, T_k, T'_k, \sigma_k$) ($2 \leq k \leq n$, $k \neq i$), the communication device $U_i$ generates a verification result $Ver_k \leftarrow (\Sigma_{j=1, \ldots, L} SMPK_j, ID_k, (R, R_k, c_k, k_k, s_k, T_k, T'_k), \sigma_k)$ from the master public key $\Sigma_{j=1, \ldots, L} SMPK_j$, a message ($R, R_k, c_k, k_k, s_k, T_k, T'_k$), and a signature $\sigma_k$, if the signature $\sigma_k$ is successfully verified, calculates $K_1^{(l)}$ by an exclusive OR of $K_i^{(l)}$ and an exclusive OR of $T_j$ ($1 \leq j \leq i-1$), calculates $k_1 \| s_1$ by an exclusive OR of $T'$ and $K_1^{(l)}$, and, if $c_k = g^{k_k} h^{s_k}$ holds for k that satisfies $1 \leq k \leq n$, generates the session key SK using the sid and an exclusive OR of the $k_i$ ($1 \leq i \leq n$) by a pseudo-random function and, for i=1, when the communication device $U_1$ obtains a second key ($k_k, s_k, T_k, T'_k, \sigma_k$) ($2 \leq k \leq n$), the communication device $U_1$ generates a verification result $Ver_k \leftarrow (\Sigma_{j=1, \ldots, L} SMPK_j, ID_k, (R, R_k, c_k, k_k, s_k, T_k, T'_k), \sigma_k)$ from the master public key $\Sigma_{j=1, \ldots, L} SMPK_j$, a message ($R, R_k, c_k, k_k, s_k, T_k, T'_k$), and a signature $\sigma_k$ and, if the signature $\sigma_k$ is successfully verified and $c_k = g^{k_k} h^{s_k}$ holds for k that satisfies $1 \leq k \leq n$, generates the session key SK using the sid and an exclusive OR of the $k_i$ ($1 \leq i \leq n$) by a pseudo-random function.

Effects of the Invention

According to the present invention, a plurality of users can share a common key with metadata being concealed. Furthermore, in the more general sense, a plurality of users can share messages with metadata being concealed.

DETAILED DESCRIPTION OF THE EMBODIMENTS

Figure 1:
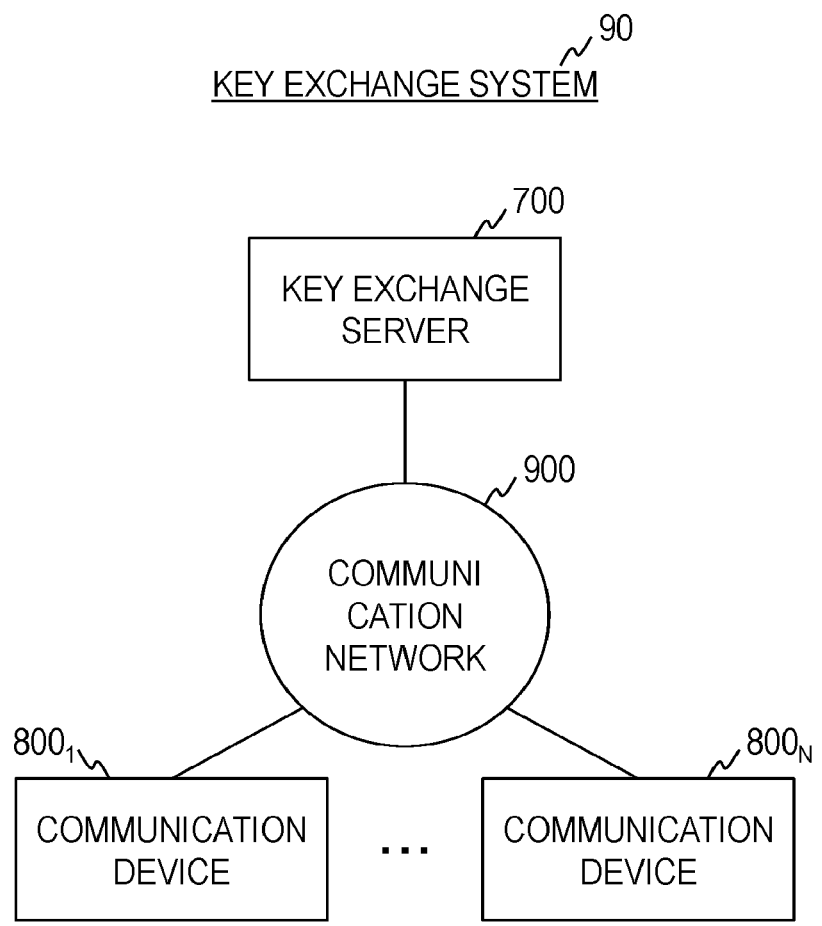
FIG. 1 is a diagram showing an example of the configuration of a key exchange system 90.

Hereinafter, an embodiment of the present invention will be described in detail. It is to be noted that component units having the same function will be identified with the same reference character and overlapping explanations will be omitted.

<Notation System>

Prior to explanations of the embodiment, a notation system which is used in this specification will be explained.

An underscore (_) represents a subscript. For example, $x^{y\_z}$ denotes that $y_z$ is a superscript attached to x and $x_{y\_z}$ denotes that $y_z$ is a subscript attached to x.

Randomly selecting an element in from a given set Set is written as $m \in_R Set$.

When a given algorithm ALG outputs y for input x and a random number r, this output is written as y←ALG(x;r). It is to be noted that, if ALG is a deterministic algorithm, the random number r is a null.

κ is assumed to be a security parameter.

[Pseudo-Random Function (PRF)]

$F=\{F_\kappa:Dom_\kappa \times FS_\kappa \to Rng_\kappa\}_\kappa$ is assumed to be a family of functions with a domain of definition $\{Dom_\kappa\}_\kappa$, a key space $\{FS_\kappa\}_\kappa$, and a range $\{Rng_\kappa\}_\kappa$. In this case, if it is impossible for a discriminator D in arbitrary polynomial time to discriminate between a function $F_\kappa$ and a true random function $RF_\kappa:Dom_\kappa \to Rng_\kappa$, $F=\{F_\kappa\}_\kappa$ is referred to as a family of pseudo-random functions. A specific example of a pseudo-random function is described in, for example, Reference Non-patent Literature 1 below.

(Reference Non-patent Literature 1: O. Goldreich, "Modern Cryptography, Probabilistic Proofs and Pseudorandomness", Springer-Verlag Tokyo, 2001)

[Target-Collision Resistant Hash Function]

$H=\{H_\kappa:Dom_\kappa \to Rng_k\}_k$ is assumed to be a family of hash functions with a domain of definition $\{Dom_\kappa\}_k$ and a range $\{Rng_\kappa\}_k$. In this case, if it is impossible for an attacker A, who is provided with $x \in_R Dom_\kappa$, in arbitrary polynomial time to find x' (≠x) which makes $H_\kappa(x)=H_\kappa(x')$ hold, $H=\{H_\kappa\}_\kappa$ is referred to as a family of target-collision resistant hash functions. A specific example of a target-collision resistant hash function is described in, for example, Reference Non-patent Literature 2 below.

(Reference Non-patent Literature 2: J. A. Buchmann, "Introduction to Cryptography—Edition 3", Maruzen Publishing Co., Ltd., 2007)

[Twisted Pseudo-Random Function (Twisted PRF)]

A function tPRF: $\{0, 1\}^\kappa \times FS_\kappa \times FS_\kappa \times \{0, 1\}^\kappa \to Rng_\kappa$ is referred to as a twisted pseudo-random function and is defined as follows using a pseudo-random function $F_\kappa$.

$$tPRF(a,a',b,b'):=F_\kappa(a,b) \oplus F_\kappa(b',a')$$

Here, a, b'∈$\{0, 1\}^\kappa$ and a', b∈$FS_\kappa$ hold. A specific example of a twisted pseudo-random function is described in, for example, Reference Non-patent Literature 3 below.

(Reference Non-patent Literature 3: Kazuki Yoneyama, "One-Round Authenticated Key Exchange with Strong Forward Secrecy in the Standard Model against Constrained Adversary", IEICE Transactions, vol. E96-A, no. 6, pp. 1124-1138, 2013.)

[Mix-Net]

A mix-net system includes M (M is an integer greater than or equal to 2) mix-net servers $S_1, \ldots, S_M$. The mix-net server $S_1$, which is the first server, receives n (n is an integer greater than or equal to 2) input messages to be processed in one round (that is, a series of processing which is performed by $S_1, \ldots, S_M$). Then, the mix-net servers shuffle the messages in the order of m=1, ..., M. The mix-net server $S_M$, which is the last server, outputs N (N is an integer greater than or equal to 2) output messages. Even if an arbitrary outside attacker colludes with an M−1 mix-net server, the attacker cannot know the relationship between the input messages and the output messages. A specific example of a secure mix-net protocol is described in, for example, Reference Non-patent Literature 4 below.

(Reference Non-patent Literature 4: Miyako Ohkubo, Masayuki Abe, "A Length-Invariant Hybrid Mix", ASIACRYPT'00, Proceedings of the 6th International Conference on the Theory and Application of Cryptology and Information Security: Advances in Cryptology, pp. 178-191, 2000.)

[Anonymous ID-Based Broadcast Encryption (AIBBE) Scheme]

An anonymous ID-based broadcast encryption scheme consists of the following four algorithms.

A master key generation algorithm ($1^\kappa$) outputs a master secret key MSK and a master public key MPK using the security parameter κ as input. A key generation center KGC is provided with the master secret key MSK. Moreover, the master public key MPK is made public.

A decryption key generation algorithm (MSK, $ID_i$) outputs a decryption key $dk_i$ using the master secret key MSK and an identifier $ID_i$ of a user i (1≤i≤N) as input. The decryption key $dk_i$ is securely transmitted to the user i.

An encryption algorithm (MPK, M, R) outputs cipher text CT using the master public key MPK, plaintext M, and a set R of recipients as input. Here, the set R of recipients is a set of identifiers of users who are the recipients of the plaintext M.

A decryption algorithm ($dk_i$, CT) outputs, if the identifier $ID_i$ of the user i is included in the set R of recipients, the plaintext M using the decryption key $dk_i$ and the cipher text CT as input.

A specific example of a secure AIBBE scheme is described in, for example, Reference Non-patent Literature 5 below.

(Reference Non-patent Literature 5: Kai He, Jian Weng, Jia-Nan Liu, Joseph K. Liu, Wei Liu, Robert H. Deng, "Anonymous Identity-Based Broadcast Encryption with Chosen-Ciphertext Security", ASIACCS'16, Proceedings of the 11th ACM on Asia Conference on Computer and Communications Security, pp. 247-255, 2016.)

An anytrust anonymous ID-based broadcast encryption (anytrust-AIBBE: AT-AIBBE) scheme is defined by using the anonymous ID-based broadcast encryption scheme. To distribute credibility, the AT-AIBBE scheme includes a plurality of key generation centers ($KGC_1, \ldots, KGC_L$) (L is an integer greater than or equal to 1). A key generation center $KGC_j$ (1≤j≤L) makes a master public key $MPK_j$ public. Moreover, the key generation center $KGC_j$ (1≤j≤L) generates a decryption key $dk_i^{(j)}$ for a user i (1≤i≤N). The user i (1≤i≤N) encrypts plaintext M and obtains cipher text CT←($\Sigma_{j=1,\ldots,L} MPK_j$, M, R). Furthermore, the user i (1≤i≤N) decrypts the cipher text CT and obtains the plaintext M←($\Sigma_{j=1,\ldots,L} dk_i^{(j)}$, CT) (only if an identifier $ID_i$ of the user i is included in a set R of recipients). Even if an L−1 key generation center of the key generation center $KGC_j$ (1≤j≤L) has a malicious intention, the L−1 key generation center cannot decrypt the cipher text CT.

[ID-Based Signature Scheme]

An ID-based signature scheme consists of the following four algorithms.

A master key generation algorithm ($1^\kappa$) outputs a master secret key SMSK and a master public key SMPK using the security parameter κ as input. A key generation center KGC is provided with the master secret key SMSK. Moreover, the master public key SMPK is made public.

A signature key generation algorithm (SMSK, $ID_i$) outputs a signature key $sk_i$ using the master secret key SMSK and an identifier $ID_i$ of a user i (1≤i≤N) as input. The signature key $sk_i$ is securely transmitted to the user i.

A signature generation algorithm (SMPK, $sk_i$, M) outputs a signature σ using the master public key SMPK, the signature key $sk_i$, and a message M as input.

A signature verifying algorithm (SMPK, $ID_i$, M, σ) outputs a verification result Ver (for example, 0 or 1 as a binary indicating the verification result) using the master public key SMPK, the identifier $ID_i$ of the user i, the message M, and the signature σ as input.

An anytrust ID-based signature (anytrust-IBS: AT-IBS) scheme is defined by using the ID-based signature scheme. To distribute credibility, the AT-TBS scheme includes a plurality of key generation centers ($KGC_1, \ldots, KGC_L$) (L is an integer greater than or equal to 1). A key generation center $KGC_j$ (1≤j≤L) makes a master public key $SMPK_j$ public. Moreover, the key generation center $KGC_j$ (1≤j≤L) generates a signature key $sk_i^{(j)}$ for a user i (1≤i≤N). The user i (1≤i≤N) obtains a signature σ←($\Sigma_{j=1, \ldots, L} SMPK_j$, $\Sigma_{=1, \ldots, L} sk_i^{(j)}$, M) as a signature for a message M. Furthermore, the user i (1≤i≤N) verifies the signature σ and obtains a verification result Ver←($\Sigma_{j=1,\ldots,L} SMPK_j$, $ID_i$, M, σ). Even if an L−1 key generation center of the key generation center $KGC_j$ (1≤j≤L) has a malicious intention, the L−1 key generation center cannot forge the signature σ.

<System Configuration>

Figure 2:
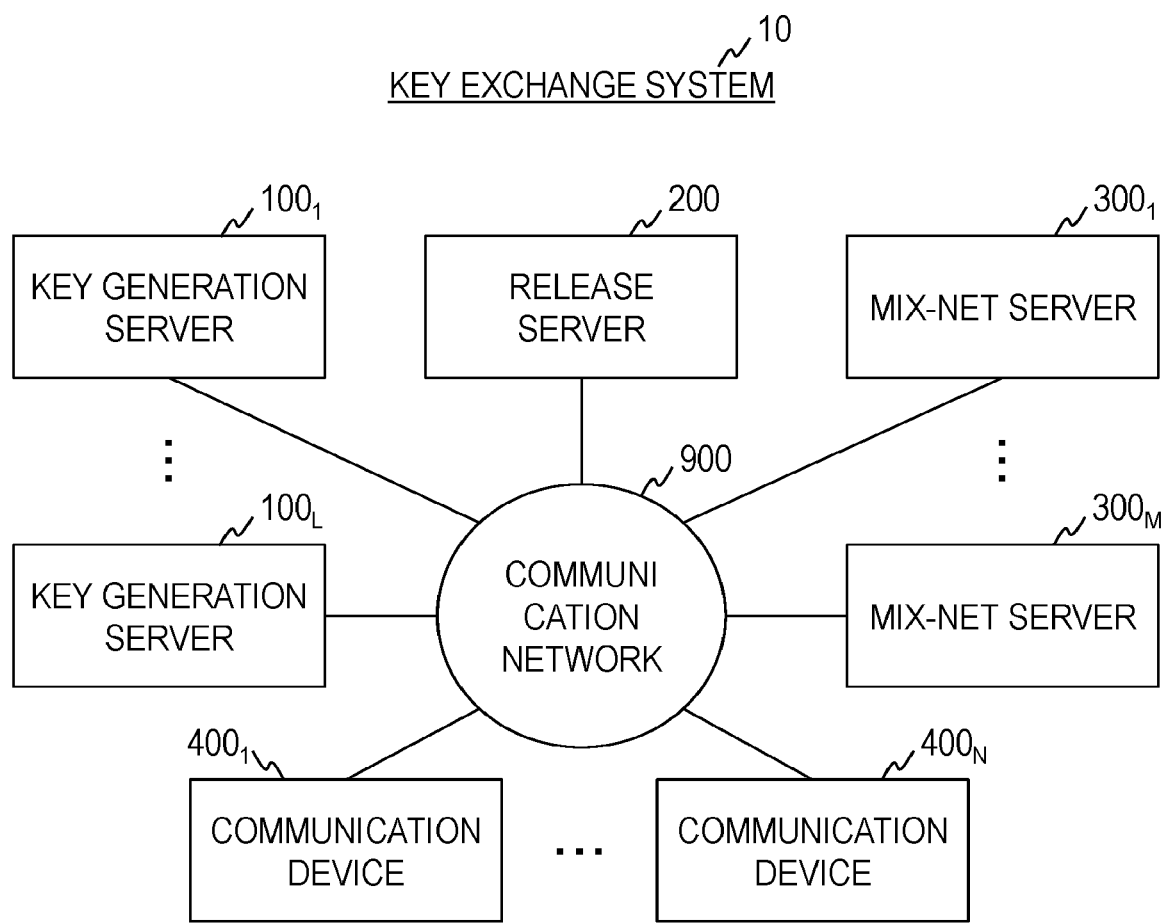
FIG. 2 is a diagram showing an example of the configuration of a key exchange system 10.

As illustrated in FIG. 2, a key exchange system 10 of the embodiment includes L (≥1) key generation servers $100_1, \ldots, 100_L$, a release server 200, M (≥2) mix-net servers $300_1, \ldots, 300_M$, and N (≥2) communication devices $400_1, \ldots, 400_N$. In this embodiment, the key generation servers $100_1, \ldots, 100_L$, the release server 200, the mix-net servers $300_1, \ldots, 300_M$, and the communication devices $400_1, \ldots, 400_N$ are each connected to a communication network 900. The communication network 900 is a circuit switching or packet-switching communication network that is configured so that the servers or the devices, which need communication, of the key generation servers $100_1, \ldots, 100_L$, the release server 200, the mix-net servers $300_1, \ldots, 300_M$, and the communication devices $400_1, \ldots, 400_N$ can communicate with each other. The communication network 900 does not necessarily have to be a communication channel whose security is ensured, and the Internet, for example, can be used as the communication network 900.

Figure 3:
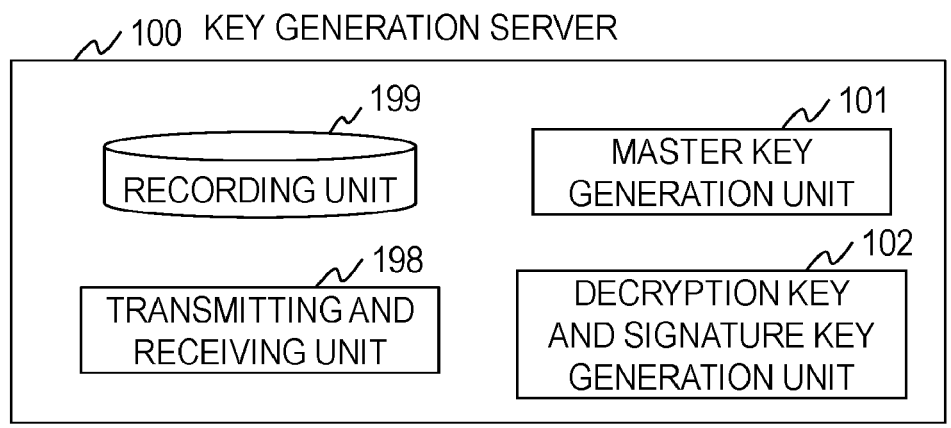
FIG. 3 is a diagram showing an example of the configuration of a key generation server 100.
Figure 4:
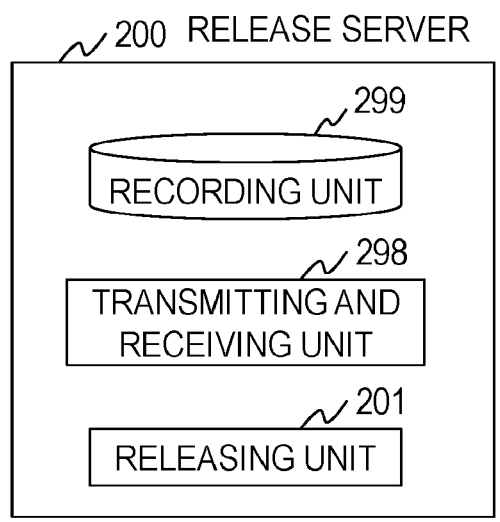
FIG. 4 is a diagram showing an example of the configuration of a release server 200.
Figure 5:
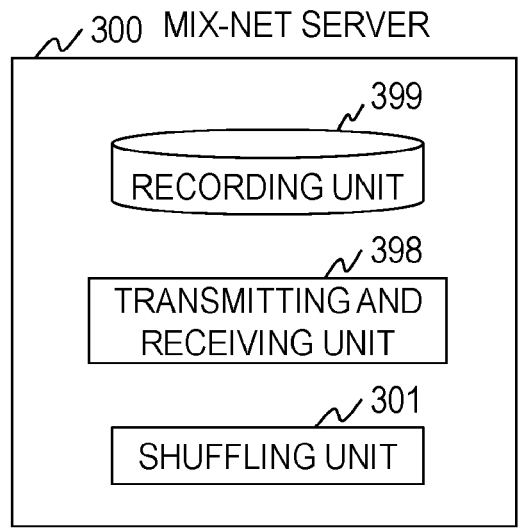
FIG. 5 is a diagram showing an example of the configuration of a mix-net server 300.
Figure 6:
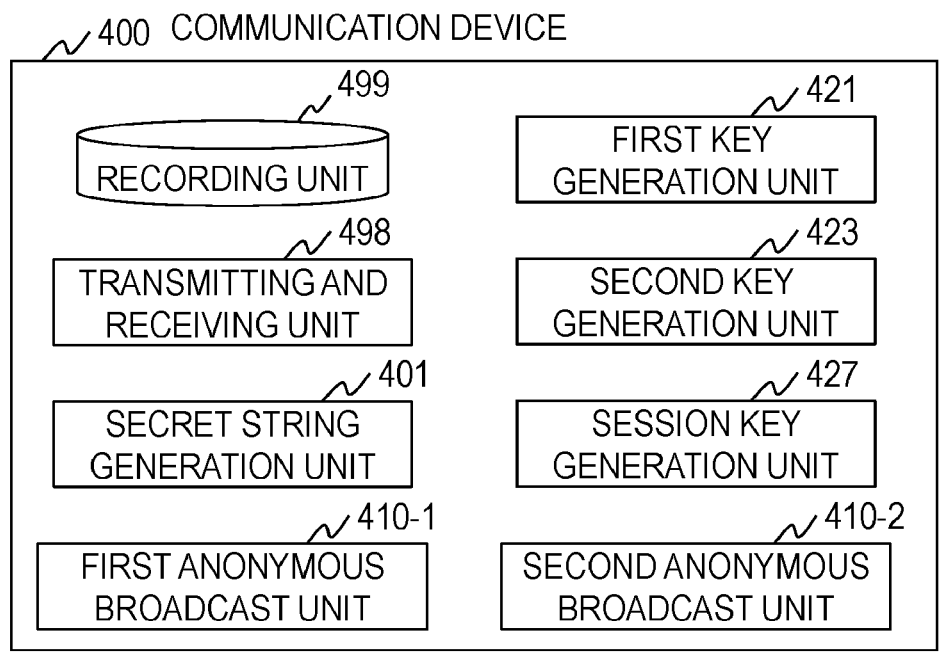
FIG. 6 is a diagram showing an example of the configuration of a communication device 400.

As illustrated in FIG. 3, the key generation server 100 includes a master key generation unit 101, a decryption key and signature key generation unit 102, a transmitting and receiving unit 198, and a recording unit 199. As illustrated in FIG. 4, the release server 200 includes a releasing unit 201, a transmitting and receiving unit 298, and a recording unit 299. As illustrated in FIG. 5, the mix-net server 300 includes a shuffling unit 301, a transmitting and receiving unit 398, and a recording unit 399. As illustrated in FIG. 6, the communication device 400 includes a secret string generation unit 401, a first anonymous broadcast unit 410-1, a second anonymous broadcast unit 410-2, a first key generation unit 421, a second key generation unit 423, a session key generation unit 427, a transmitting and receiving unit 498, and a recording unit 499.

Figure 7:
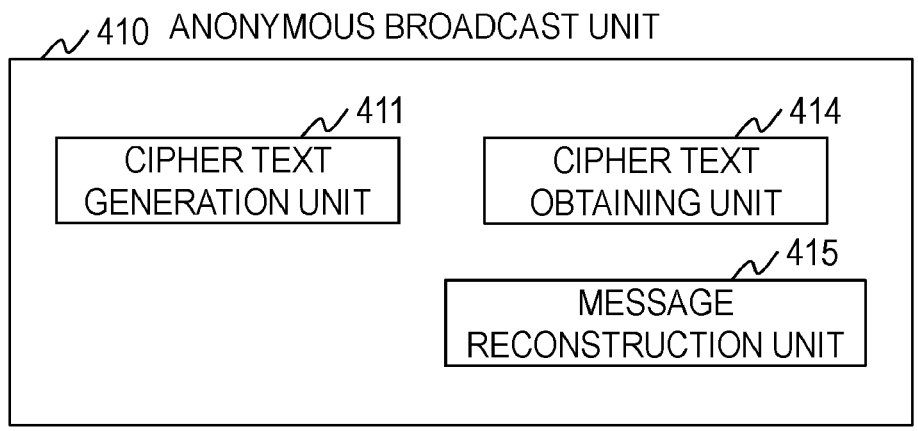
FIG. 7 is a diagram showing an example of the configuration of an anonymous broadcast unit 410.

Here, the first anonymous broadcast unit 410-1 and the second anonymous broadcast unit 410-2 each provide a function for sharing a message between communication devices belonging to a designated set of communication devices. That is, the first anonymous broadcast unit 410-1 and the second anonymous broadcast unit 410-2 provide the same function. Therefore, the first anonymous broadcast unit 410-1 and the second anonymous broadcast unit 410-2 will be explained as an anonymous broadcast unit 410 in the following description. As illustrated in FIG. 7, the anonymous broadcast unit 410 includes a cipher text generation unit 411, a cipher text obtaining unit 414, and a message reconstruction unit 415.

A key exchange method of the embodiment is implemented as a result of these key generation servers $100_1, \ldots, 100_L$, the release server 200, the mix-net servers $300_1, \ldots, 300_M$, and the communication devices $400_1, \ldots, 400_N$ performing processing in steps illustrated in FIGS. 8 to 12.

The key generation servers $100_1, \ldots, 100_L$, the release server 200, the mix-net servers $300_1, \ldots, 300_M$, and the communication devices $400_1, \ldots, 400_N$ are each a special device configured as a result of a special program being read into a publicly known or dedicated computer including, for example, a central processing unit (CPU), a main storage unit (random access memory: RAM), and so forth. Each device executes each processing under the control of the central processing unit, for example. The data input to each device and the data obtained by each processing are stored in the main storage unit, for instance, and the data stored in the main storage unit is read into the central processing unit when necessary and used for other processing. At least part of each processing unit of each device may be configured with hardware such as an integrated circuit.

Each of the recording units of the key generation servers $100_1, \ldots, 100_L$, the release server 200, the mix-net servers $300_1, \ldots, 300_M$, and the communication devices $400_1, \ldots, 400_N$ can be configured with, for example, a main storage unit such as random access memory (RAM), an auxiliary storage unit configured with a hard disk, an optical disk, or a semiconductor memory device such as flash memory, or middleware such as a relational database or a key-value store. When the recording unit stores secret information, it is desirable that the recording unit is a tamper-resistant storage unit (for example, a SIM card).

In the following explanation, symbols are defined as follows. $U_i$ (i∈{1, . . . , N}) is assumed to denote N communication devices $400_1, \ldots, 400_N$. Likewise, $S_m$ (m∈{1, . . . , M}) is assumed to denote M mix-net servers $300_1, \ldots, 300_M$.

Moreover, p is assumed to be a K-bit prime number and G is assumed to be a finite cyclic group of order p with generators g and h. TCR:$\{0, 1\}^* \to \{0, 1\}^K$ is assumed to be a target-collision resistant hash function. tPRF:$\{0, 1\}^K \times FS_K \times FS_K \times \{0, 1\}^K \to Z_p$ and tPRF':$\{0, 1\}^K \times FS_K \times FS_K \times \{0, 1\}^K \to FS_K$ are assumed to be twisted pseudo-random functions. F:$\{0, 1\}^K \times G \to Z_p^2$, F':$\{0, 1\}^K \times Z_p \to FS_K$, F'':$\{0, 1\}^K \times FS_K \to \{0, 1\}^K$, and F''':$\{0, 1\}^K \times FS_K \to Z_p$ are assumed to be pseudo-random functions.

<System Setup>

Figure 8:
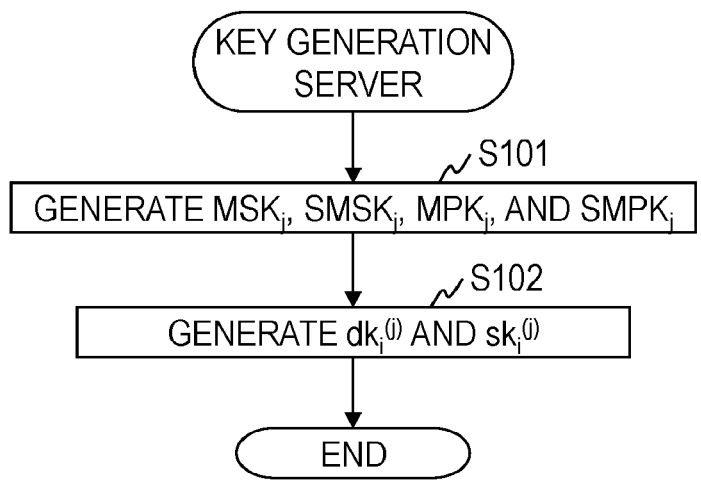
FIG. 8 is a diagram showing an example of the operation of the key generation server 100 in system setup.
Figure 9:
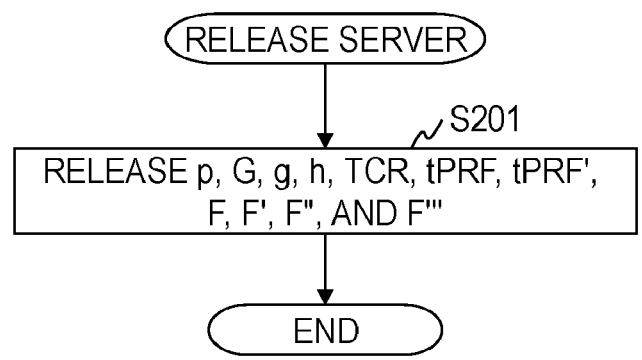
FIG. 9 is a diagram showing an example of the operation of the release server 200 in system setup.
Figure 10:
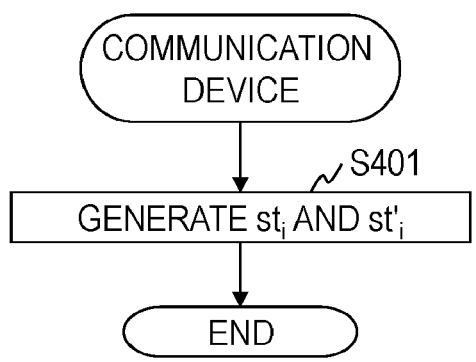
FIG. 10 is a diagram showing an example of the operation of the communication device 400 in system setup.

A processing procedure of system setup in the key exchange method of the embodiment will be described with reference to FIGS. 8 to 10.

The operation of a key generation server $100_j$ (1≤j≤L) will be described with reference to FIG. 8. In Step S101, the master key generation unit 101 of the key generation server $100_j$ (1≤j≤L) generates master secret keys ($MSK_j$, $SMSK_j$) and master public keys ($MPK_j$, $SMPK_j$) from the security parameter κ by the master key generation algorithm of the anonymous ID-based broadcast encryption scheme and the master key generation algorithm of the ID-based signature scheme.

Next, in Step S102, the decryption key and signature key generation unit 102 of the key generation server $100_j$ (1≤j≤L) generates a decryption key $dk_i^{(j)} \leftarrow$($MSK_j$, $ID_i$) from the master secret key $MSK_j$ and an identifier $ID_i$ of a communication device $U_i$ (1≤i≤N) by the decryption key generation algorithm of the anonymous ID-based broadcast encryption scheme and generates a signature key $sk_i^{(j)} \leftarrow$($SMSK_j$, $ID_i$) from the master secret key $SMSK_j$ and the identifier $ID_i$ of the communication device $U_i$ (1≤i≤N) by the signature key generation algorithm of the ID-based signature scheme. The key generation server $100_j$ (1≤j≤L) transmits the decryption key $dk_i^{(j)}$ and the signature key $sk_i^{(j)}$ to the communication device $U_i$ (1≤i≤N) using the transmitting and receiving unit 198. The communication device $U_i$ records the received decryption key $dk_i^{(j)}$ and signature key $sk_i^{(j)}$ (1≤j≤L) on the recording unit 499. Moreover, the communication device $U_i$ obtains the master public keys ($MPK_j$, $SMPK_j$) (1≤j≤L) and records the master public keys ($MPK_j$, $SMPK_j$) on the recording unit 499.

It is to be noted that the master secret keys ($MSK_j$, $SMSK_j$) which are generated by the key generation server 100$_j$ are periodically updated to ensure the forward confidentiality of metadata. The period of this update can be set so that an update is performed once per day, for example.

The operation of the release server 200 will be described with reference to FIG. 9. In Step S201, the releasing unit 201 of the release server 200 releases (p, G, g, h, TCR, tPRF, tPRF', F, F', F'', F''') so that the communication device $U_i$ (1≤i≤N) can obtain (p, G, g, h, TCR, tPRF, tPRF', F, F', F'', F'''). The communication device $U_i$ (1≤i≤N) obtains (p, G, g, h, TCR, tPRF, tPRF', F, F', F'', F''') from the release server 200 as appropriate and records (p, G, g, h, TCR, tPRF, tPRF', F, F', F'', F''') on the recording unit 499.

The operation of the communication device $U_i$ (1≤i≤N) will be described with reference to FIG. 10. In Step S401, the secret string generation unit 401 of the communication device $U_i$ generates secret strings ($st_i$, $st'_i$), which are input to a twisted pseudo-random function (where $st_i \in_R FS_k$ and $st'_i \in_R \{0, 1\}^\kappa$). The communication device $U_i$ records the generated ($st_i$, $st'_i$) on the recording unit 499.

<Anonymous Broadcast>

Figure 11:
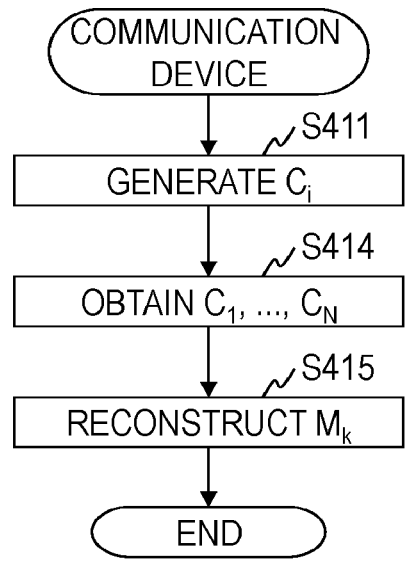
FIG. 11 is a diagram showing an example of the operation of the communication device 400 in broadcast.

A processing procedure of anonymous broadcast in the key exchange method of the embodiment will be described with reference to FIG. 11. This processing procedure of anonymous broadcast is used in a processing procedure of session key generation, which will be described later.

A set of communication devices is assumed to be $R = \{U_{i\_1}, \ldots, U_{i\_n}\}$ (where $\{i_1, \ldots, i_n\} \subseteq \{1, \ldots, N\}$), and a communication device $U_{i\_k}$ (1≤k≤n) performs anonymous broadcast so as to share a message $M_{i\_k}$ with each communication device belonging to the set R with the message $M_{i\_k}$ being concealed. That is, each communication device belonging to the set R can receive messages $M_{i\_1}, \ldots, M_{i\_n}$, but each communication device which does not belong to the set R cannot receive the messages $M_{i\_1}, \ldots, M_{i\_n}$.

Hereinafter, for the sake of simplification, an explanation will be given on the assumption that the set $R = \{U_{i\_1}, \ldots, U_{i\_n}\} = \{U_1, \ldots, U_n\}$. This does not lead to loss of generality.

In anonymous broadcast in one round (one unit of processing), the following three procedures are executed.

(1) Signature and Encryption

This procedure is executed separately in two cases: a case where the communication device $U_i$ is included in the set R and a case where the communication device $U_i$ is not included in the set R.

In Step S411, if $U_i \in R$, the cipher text generation unit 411 of the communication device $U_i$ generates, from a master public key $\Sigma_{j=1, \ldots, L} SMPK_j$, a signature key $\Sigma_{j=1, \ldots, L} sk_i^{(j)}$, and a message ($ID_i$, $M_i$) (that is, a tuple of the identifier $ID_i$ of the communication device $U_i$, which is a source, and an original message $M_i$ to be shared), a signature $\omega_i \leftarrow (\Sigma_{j=1, \ldots, L} SMPK_j, \Sigma_{j=1, \ldots, L} sk_i^{(j)}, (ID_i, M_i))$ for the message ($ID_i$, $M_i$) by the signature generation algorithm of the ID-based signature scheme. The cipher text generation unit 411 of the communication device $U_i$ generates cipher text $C_i \leftarrow (\Sigma_{j=1, \ldots, L} MPK_j, (ID_i, \omega_i, M_i), (R-\{U_i\}))$ from a master public key $\Sigma_{j=1, \ldots, L} MPK_j$, plaintext ($ID_i$, $\omega_i$, $M_i$) (that is, a tuple of the identifier $ID_i$ of the communication device $U_i$, the signature $\omega_i$, and the original message $M_i$) and a set $R - \{U_i\}$ of recipients by the encryption algorithm of the anonymous ID-based broadcast encryption scheme.

If $U_i \in \{U_1, \ldots, U_N\} - R$, the cipher text generation unit 411 of the communication device $U_i$ generates cipher text $C_i$ which is a dummy message. For example, the dummy message $C_i$ is the cipher text $C_i$ obtained by encrypting an appropriate message $M_i$ by the master public key $\Sigma_{i=1, \ldots, L} MPK_j$ with $\varphi$, which means no recipient, being designated. By doing so, decryption of the cipher text in Step S415, which will be described later, fails without exception.

(2) Mix-Net

The communication device $U_i \in \{U_1, \ldots, U_N\}$ transmits the cipher text $C_i$ generated in S411 to the mix-net server $S_1$ using the transmitting and receiving unit 498. The mix-net servers $S_1, \ldots, S_M$ sequentially shuffle the cipher text ($C_1, \ldots, C_N$) received by the mix-net server $S_1$. The mix-net server $S_M$ posts the shuffled cipher text (~$C_1, \ldots,$ ~$C_N$) obtained by shuffling the cipher text ($C_1, \ldots, C_N$), which is an output message, on a release bulletin board. Here, ($C_1, \ldots, C_N$) and (~$C_1, \ldots,$ ~$C_N$) are equal as a set. That is, $\{$~$C_1, \ldots,$ ~$C_N\} = \{C_1, \ldots, C_N\}$. For instance, the mix-net server $S_M$ only has to upload the shuffled cipher text (~$C_1, \ldots,$ ~$C_N$) to the release server 200 to post the shuffled cipher text (~$C_1, \ldots,$ ~$C_N$). This allows the communication device $U_i$ (1≤i≤N) to obtain the shuffled cipher text (~$C_1, \ldots,$ ~$C_N$).

(3) Downloading and Check

In Step S414, the cipher text obtaining unit 414 of the communication device $U_i \in \{U_1, \ldots, U_N\}$ obtains the cipher text $\{C_1, \ldots, C_N\}$ by downloading the shuffled cipher text (~$C_1, \ldots,$ ~$C_N$) from the bulletin board.

In Step S415, the message reconstruction unit 415 of the communication device $U_i \in \{U_1, \ldots, U_N\}$ generates plaintext ($ID_k$, $\omega_k$, $M_k$)$\leftarrow(\Sigma_{j=1, \ldots, L} dk_i^{(j)}, C_k)$ from a decryption key $\Sigma_{j=1, \ldots, L} dk_i^{(j)}$ and cipher text $C_k$ (1≤k≤N) by the decryption algorithm of the anonymous ID-based broadcast encryption scheme (only if $U_i \in R - \{U_k\}$). If the cipher text $C_k$ is successfully decrypted, the message reconstruction unit 415 of the communication device $U_i$ generates a verification result $Ver_k \leftarrow (\Sigma_{j=1, \ldots, L} SMPK_j, ID_k, M_k, \omega_k)$ from the master public key $\Sigma_{i=1, \ldots, L} SMPK_j$ and a message ($ID_k$, $\omega_k$, $M_k$) by the signature verifying algorithm of the ID-based signature scheme and verifies a signature $\omega_k$. If the signature $\omega_k$ is successfully verified, the message reconstruction unit 415 of the communication device $U_i$ regards a message $M_k$ as a message transmitted from a communication device $U_k$ with an identifier $ID_k$. As a result, the communication device $U_i \in R$ obtains messages $M_1, \ldots, M_n$ (including the message $M_i$ which the communication device $U_i$ itself has transmitted). On the other hand, the communication device $U_i \in \{U_1, \ldots, U_N\} - R$ cannot obtain the messages $M_1, \ldots, M_n$.

As described above, the communication device $U_i$ does not need to use a public key infrastructure because the communication device $U_i$ encrypts the information on destinations (the set $R - \{U_i\}$ of recipients) along with the original message by the encryption algorithm of the anonymous ID-based broadcast encryption scheme. This makes it possible to conceal the information on destinations, which is one of metadata. Moreover, since each communication device receives the cipher text via a mix-net and reconstructs the original message, it is possible to conceal the information on a source (the sender $U_i$), which is one of metadata. That is, a plurality of users can share messages with metadata being concealed.

<Session Key Generation>

Figure 12:
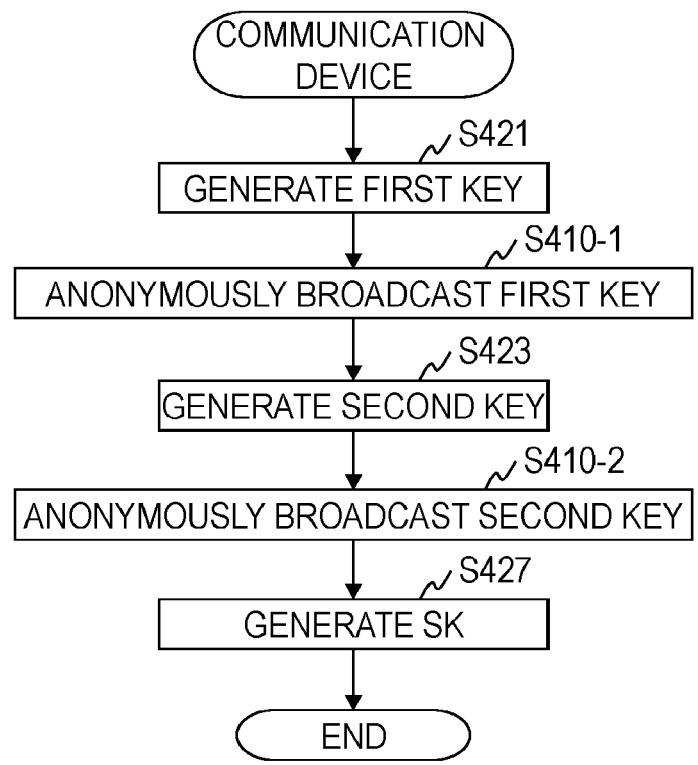
FIG. 12 is a diagram showing an example of the operation of the communication device 400 in session key generation.

A processing procedure of session key generation in the key exchange method of the embodiment will be described with reference to FIG. 12.

A new session is started between the communication devices of the set R of communication devices=$\{U_{i\_1}, \ldots, U_{i\_n}\}$ (where $\{i_1, \ldots, i_n\} \subseteq \{1, \ldots, N\}$) and a session key is shared among the communication devices.

Hereinafter, for the sake of simplification, an explanation will be given on the assumption that the set $R=\{U_{i\_1}, \ldots, U_{i\_n}\}=\{U_1, \ldots, U_n\}$ and a communication device $U_{i\_1}=U_1$ in the same fashion as described above. This does not lead to loss of generality.

A communication device $U_1$ which desires to share the session key with each communication device belonging to the set R with the session key being concealed is referred to as a representative communication device. Moreover, communication devices of a set $R-\{U_1\}$ are referred to as general communication devices.

(1) Round 1: First Broadcast

This procedure is executed separately in two cases: a case where the communication device $U_i$ is included in the set R and a case where the communication device $U_i$ is not included in the set R.

In Step S421, if $U_i \in R$, the first key generation unit 421 of the communication device $U_i$ generates $\tilde{r}_i \in_R \{0, 1\}^\kappa$, $\tilde{r}'_i \in_R FS_\kappa$, $\tilde{k}_i \in_R \{0, 1\}^\kappa$, $\tilde{k}'_i \in_R FS_\kappa$, $\tilde{s}_i \in_R \{0, 1\}$, and $\tilde{s}'_i \in_R FS_\kappa$ and calculates $r_i = tPRF(\tilde{r}_i, \tilde{r}'_i, st_i, st'_i)$, $k_i = tPRF(\tilde{k}_i, \tilde{k}'_i, st_i, st'_i)$, and $s_i = tPRF(\tilde{s}_i, \tilde{s}'_i, st_i, st'_i)$. Furthermore, the first key generation unit 421 of the communication device $U_i$ calculates $R_i = g^{r_i}$ and $c_i = g^{k_i} h^{s_i}$ and generates a first key $(R_i, c_i)$.

If $U_i \in \{U_1, \ldots, U_N\} - R$, the first key generation unit 421 of the communication device $U_i$ randomly selects $R_i, c_i \in_R G$ and generates a first key $(R_i, c_i)$.

In Step S410-1, if $U_i \in R$, the first anonymous broadcast unit 410-1 of the communication device $U_i$ anonymously broadcasts the first key $(R_i, c_i)$ with the set $R-\{U_i\}$ being designated.

If $U_i \in \{U_1, \ldots, U_N\} - R$, the first anonymous broadcast unit 410-1 of the communication device $U_i$ anonymously broadcasts the first key $(R_i, c_i)$ with $\varphi$, which means no recipient, being designated.

(2) Round 2: Second Broadcast

This procedure is executed separately in three cases: a case where the communication device $U_i$ is included in the set $R-\{U_1\}$, a case where the communication device $U_i$ is $U_1$, and a case where the communication device $U_i$ is not included in the set R.

In Step S423, if $U_i \in R-\{U_1\}$, when the communication device $U_i$ receives a first key $(R_k, c_k)$ from each communication device $U_k$ ($1 \le k \le n$, $k \ne i$) belonging to the set $R-\{U_i\}$, the second key generation unit 423 of the communication device $U_i$ calculates $sid=TCR(c_1, \ldots, c_n)$. Here, sid is referred to as a session ID. Next, the second key generation unit 423 of the communication device $U_i$ calculates $K_i^{(l)}$, $K_i^{(r)}$, and $T_i$ by the following formulae and randomly selects $T'_i \in_R Z_p^2$.

$$K_i^{(l)} = F(sid, R_{i-1}^{r_i})$$

$$K_i^{(r)} = F(sid, R_{i+1}^{r_i})$$

$$T_i = K_i^{(l)} \oplus K_i^{(r)}$$

That is, $T_i$ is the exclusive OR of $K_i^{(l)}$ and $K_i^{(r)}$.

The second key generation unit 423 of the communication device $U_i$ generates, from the master public key $\Sigma_{j=1, \ldots, L} SMPK_j$, the signature key $\Sigma_{j=1, \ldots, L} sk_i^{(j)}$, and a message $(R, R_i, c_i, k_i, s_i, T_i, T'_i)$ (that is, a tuple of the set R of recipients, $R_i, c_i, k_i$, and $s_i$ generated in S421, and $T_i$ and $T'_i$ just generated), a signature $\sigma_i \leftarrow (\Sigma_{j=1, \ldots, L} SMPK_j, \Sigma_{j=1, \ldots, L} sk_i^{(j)}, (R, R_i, c_i, k_i, s_i, T_i, T'_i))$ for the message $(R, R_i, c_i, k_i, s_i, T_i, T'_i)$ by the signature generation algorithm of the ID-based signature scheme. The second key generation unit 423 of the communication device $U_i$ generates $(k_i, s_i, T_i, T'_i, \sigma_i)$ as a second key.

If $U_i = U_1$, when the communication device $U_1$ receives a first key $(R_k, c_k)$ from each communication device $U_k$ ($2 \le k \le n$) belonging to the set $R-\{U_1\}$, the second key generation unit 423 of the communication device $U_i$ calculates $sid=TCR(c_1, \ldots, c_n)$. Next, the second key generation unit 423 of the communication device $U_i$ calculates $K_1^{(l)}$, $K_1^{(r)}$, $T_1$, and T' by the following formulae and randomly selects $k''_1, s''_1 \in_R Z_p$.

$$K_1^{(l)} = F(sid, R_n^{r_1})$$

$$K_1^{(r)} = F(sid, R_2^{r_1})$$

$$T_1 = K_1^{(l)} \oplus K_1^{(r)}$$

$$T' = K_1^{(l)} \oplus (k_1 \| s_1)$$

Here, $\|$ is a concatenation operator.

The second key generation unit 423 of the communication device $U_i$ generates, from the master public key $\Sigma_{j=1, \ldots, L} SMPK_j$, a signature key $\Sigma_{j=1, \ldots, L} sk_i^{(j)}$, and a message $(R, R_1, c_1, k''_1, s''_1, T_1, T')$ (that is, a tuple of the set R of recipients, $R_1$ and $c_1$ generated in S421, and $k''_1, s''_1, T_1$, and T' just generated), a signature $\sigma_1 \leftarrow (\Sigma_{j=1, \ldots, L} SMPK_j, \Sigma_{j=1, \ldots, L} sk_1^{(j)}, (R, R_1, c_1, k''_1, s''_1, T_1, T'))$ for the message $(R, R_1, c_1, k''_1, s''_1, T_1, T')$ by the signature generation algorithm of the ID-based signature scheme. The second key generation unit 423 of the communication device $U_i$ generates $(k''_1, s''_1, T_1, T', \sigma_1)$ as a second key.

If $U_i \in \{U_1, \ldots, U_N\} - R$, the second key generation unit 423 of the communication device $U_i$ randomly selects $k_i, s_i \in_R Z_p$, $T_i, T'_i \in_R Z_p^2$, and a signature $\sigma_i$ which is an element of a signature space $\Sigma$. The second key generation unit 423 of the communication device $U_i$ generates $(k_i, s_i, T_i, T'_i, \sigma_i)$ as a second key.

In Step S410-2, if $U_i \in R-\{U_1\}$, the second anonymous broadcast unit 410-2 of the communication device $U_i$ anonymously broadcasts the second key $(k_i, s_i, T_i, T'_i, \sigma_i)$ with the set $R-\{U_i\}$ being designated.

If $U_i = U_1$, the second anonymous broadcast unit 410-2 of the communication device $U_i$ anonymously broadcasts the second key $(k''_1, s''_1, T_1, T', \sigma_i)$ with the set $R-\{U_1\}$ being designated.

If $U_i \in \{U_1, \ldots, U_N\} - R$, the second anonymous broadcast unit 410-2 of the communication device $U_i$ anonymously broadcasts the second key $(k_i, s_i, T_i, T'_i, \sigma_i)$ with $\varphi$, which means no recipient, being designated.

(3) Session Key Generation

This procedure is executed separately in three cases: a case where the communication device $U_i$ is included in the set $R-\{U_1\}$, a case where the communication device $U_i$ is $U_1$, and a case where the communication device $U_i$ is not included in the set R.

It is to be noted that, if the communication device $U_i$ is not included in the set R, the communication device $U_i$ executes no processing. That is, the communication device $U_i$ which is not included in the set R performs no processing.

In Step S427, if $U_i \in R-\{U_1\}$, when the communication device $U_i$ receives the second key $(k''_1, s''_1, T_1, T', \sigma_1)$ and a second key $(k_k, s_k, T_k, T'_k, \sigma_k)$ ($2 \le k \le n$, $k \ne i$) from each communication device $U_k$ ($1 \le k \le n$, $k \ne i$) belonging to the set R-$\{U_i\}$, the session key generation unit 427 of the communication device $U_i$ generates a verification result $\text{Ver}_k \leftarrow (\Sigma_{j=1,\ldots,L}\text{SMPK}_j, \text{ID}_k, (R, R_k, c_k, k_k, s_k, T_k, T'_k), \sigma_k)$ from the master public key $\Sigma_{j=1,\ldots,L}\text{SMPK}_j$, an identifier $\text{ID}_k$, a message $(R, R_k, c_k, k_k, s_k, T_k, T'_k)$ (that is, a tuple of the set R of recipients, $R_k$ and $c_k$ received in S423, and $k_k$, $s_k$, $T_k$, and $T'_k$ received at the start of S427), and a signature $\sigma_k$ received at the start of S427 by the signature verifying algorithm of the ID-based signature scheme and verifies the signature $\sigma_k$. If the signature $\sigma_k$ is not successfully verified, the session key generation unit 427 of the communication device $U_i$ stops the processing. The session key generation unit 427 of the communication device $U_i$ calculates $K_1^{(I)}$ and $k_1 \| s_1$ by the following formulae and checks whether $c_k = g^{k\_k} h^{s\_k}$ holds for k that satisfies $1 \leq k \leq n$.

$$K_1^{(I)} = K_i^{(I)} \oplus (\oplus_{1 \leq j \leq i-1} T_j)$$

$$k_1 \| s_1 = T' \oplus K_1^{(I)}$$

If $c_k = g^{k\_k} h^{s\_k}$ does not hold for at least one of k that satisfies $1 \leq k \leq n$, the session key generation unit 427 of the communication device $U_i$ stops the processing. The session key generation unit 427 of the communication device $U_i$ calculates a session key SK by the following formula.

$$SK = F'(sid, \oplus_{1 \leq i \leq n} k_i)$$

If $U_i = U_1$, when the communication device $U_1$ receives a second key $(k_k, s_k, T_k, T'_k, \sigma_k)$ from each communication device $U_k$ ($2 \leq k \leq n$) belonging to the set R-$\{U_1\}$, the session key generation unit 427 of the communication device $U_1$ generates a verification result $\text{Ver}_k \leftarrow (\Sigma_{j=1,\ldots,L}\text{SMPK}_j, \text{ID}_k, (R, R_k, c_k, k_k, s_k, T_k, T'_k), \sigma_k)$ from the master public key $\Sigma_{j=1,\ldots,L}\text{SMPK}_j$, an identifier $\text{ID}_k$, a message $(R, R_k, c_k, k_k, s_k, T_k, T'_k)$ (that is, a tuple of the set R of recipients, $R_k$ and $c_k$ received in S423, and $k_k$, $s_k$, $T_k$, and $T'_k$ received at the start of S427), and a signature $\sigma_k$ received at the start of S427 by the signature verifying algorithm of the ID-based signature scheme and verifies the signature $\sigma_k$. If the signature $\sigma_k$ is not successfully verified, the session key generation unit 427 of the communication device $U_1$ stops the processing. Moreover, the session key generation unit 427 of the communication device $U_1$ checks whether $c_k = g^{k\_k} h^{s\_k}$ holds for k that satisfies $1 \leq k \leq n$. If $c_k = g^{k\_k} h^{s\_k}$ does not hold for at least one of k that satisfies $1 \leq k \leq n$, the session key generation unit 427 of the communication device $U_1$ stops the processing. The session key generation unit 427 of the communication device $U_1$ generates a session key SK by the following formula.

$$SK = F'(sid, \oplus_{1 \leq i \leq n} k_i)$$

If $U_i \in \{U_1, \ldots, U_N\}$-R, as described earlier, the session key generation unit 427 of the communication device $U_i$ does not generate a session key SK.

With the above-described configuration, a key exchange technique of this invention makes it possible for a plurality of communication devices to share a session key with metadata being concealed.

Anonymous broadcast establishes a concealed communication channel, by which messages can be exchanged at regular intervals, by using the mix-net. By implementing a key exchange by the session key generation procedure using this concealed communication channel, concealment of metadata is implemented. Furthermore, by performing communication using the shared session key, concealed communication is implemented. In this way, leak of metadata from a key exchange protocol can be prevented, which makes it possible to conceal the metadata completely.

The use of this key exchange protocol provides a global company and a company using satellite communications with a network such as The Onion Router (Tor) that makes a connection path in TCP/IP anonymous, for example, which makes it possible to ensure confidentiality including metadata in communication.

It goes without saying that this invention is not limited to the above embodiment but modifications may be made within the scope of this invention. Also, the various processes described in the embodiment may be executed not only in a chronological sequence in accordance with the order of their description but may be executed in parallel or separately according to the processing capability of the device executing the processing or any necessity.

[Program and Recording Medium]

When various types of processing functions in the devices described in the above embodiment are implemented on a computer, the contents of processing function to be contained in each device is written by a program. With this program executed on the computer, various types of processing functions in the above-described devices are implemented on the computer.

This program in which the contents of processing are written can be recorded in a computer-readable recording medium. The computer-readable recording medium may be any medium such as a magnetic recording device, an optical disk, a magneto-optical recording medium, and a semiconductor memory.

Distribution of this program is implemented by sales, transfer, rental, and other transactions of a portable recording medium such as a DVD and a CD-ROM on which the program is recorded, for example. Furthermore, this program may be stored in a storage unit of a server computer and transferred from the server computer to other computers via a network so as to be distributed.

A computer which executes such program first stores the program recorded in a portable recording medium or transferred from a server computer once in a storage unit thereof, for example. When the processing is performed, the computer reads out the program stored in the storage unit thereof and performs processing in accordance with the program thus read out. As another execution form of this program, the computer may directly read out the program from a portable recording medium and perform processing in accordance with the program. Furthermore, each time the program is transferred to the computer from the server computer, the computer may sequentially perform processing in accordance with the received program. Alternatively, a configuration may be adopted in which the transfer of a program to the computer from the server computer is not performed and the above-described processing is executed by so-called application service provider (ASP)-type service by which the processing functions are implemented only by an instruction for execution thereof and result acquisition. It should be noted that a program in this form includes information which is provided for processing performed by electronic calculation equipment and which is equivalent to a program (such as data which is not a direct instruction to the computer but has a property specifying the processing performed by the computer).

In this form, the present device is configured with a predetermined program executed on a computer. However, the present device may be configured with at least part of these processing contents realized in a hardware manner.

The foregoing description of the embodiment of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A key exchange method, implemented on a system that includes N communication devices $U_1, \ldots, U_N$, wherein N is assumed to be an integer greater than or equal to 2 and L is assumed to be an integer greater than or equal to 1, the key exchange method allows communication devices of the N communication devices $U_1, \ldots, U_N$, the communication devices included in a set R of communication devices=$\{U_1, \ldots, U_n\}$ ($2 \leq n \leq N$), to share a session key SK over a network, $ID_i$ ($1 \leq i \leq N$) is assumed to be an identifier of a communication device $U_i$, $MPK_j$ ($1 \leq j \leq L$) is assumed to be a master public key of an anonymous ID-based broadcast encryption scheme, $SMPK_j$ ($1 \leq j \leq L$) is assumed to be a master public key of an ID-based signature scheme, $dk_i^{(j)}$ ($1 \leq i \leq N$, $1 \leq j \leq L$) is assumed to be a decryption key of the anonymous ID-based broadcast encryption scheme, $sk_i^{(j)}$ ($1 \leq i \leq N$, $1 \leq j \leq L$) is assumed to be a signature key of the ID-based signature scheme, G is assumed to be a finite cyclic group of prime number order p with generators g and h, and ∥ is assumed to be a concatenation operator, secret strings $st_i$ and $st'_i$ are recorded on a recording unit of the communication device $U_i$ ($1 \leq i \leq N$), and the key exchange method comprising:

a first key generation step in which for $i \in \{1, \ldots, n\}$, the communication device $U_i$ calculates $r_i$, $k_i$, and $s_i$ using the secret strings $st_i$ and $st'_i$ by a twisted pseudo-random function and generates a key of a first type $(R_i, c_i)$ by calculating $R_i = g^{r_i}$ and $c_i = g^{k_i} h^{s_i}$, and for $i \in \{n+1, \ldots, N\}$, the communication device $U_i$ randomly selects $R_i$, $c_i \in_R G$ and generates a key of the first type $(R_i, c_i)$, a first anonymous broadcast step in which for $i \in \{1, \ldots, n\}$, the communication device $U_i$ anonymously broadcasts, over the network to which the communication devices are connected, the key of the first type $(R_i, c_i)$ with a set $R-\{U_i\}$ being designated, by transmitting cipher text $C_i$ generated from the key of the first type $(R_i, c_i)$ to a mix-net server, the mix-net server outputs shuffled cipher text of $\{C'_1, \ldots, C'_N\}$ to a release server that releases the shuffled cipher text of $\{C'_1, \ldots, C'_N\}$ as an output message, on a bulletin board, and for $i \in \{n+1, \ldots, N\}$, the communication device $U_i$ anonymously broadcasts, over the network, the key of the first type $(R_i, c_i)$ with φ, which means no recipient, being designated, by transmitting cipher text $C_i$ generated from the key of the first type $(R_i, c_i)$ to the mix-net server, the mix-net server outputs shuffled cipher text of $\{C'_1, \ldots, C'_N\}$ to the release server that releases the shuffled cipher text of $\{C'_1, \ldots, C'_N\}$ as an output message, on the bulletin board, a second key generation step in which for $i \in \{2, \ldots, n\}$, the communication device $U_i$ calculates a session ID sid using $c_k$ ($1 \leq k \leq n$) by a target-collision resistant hash function, calculates $K_i^{(l)}$ using (sid, $R_{i-1}^{r_i}$) by a pseudo-random function, calculates $K_i^{(r)}$ using (sid, $R_{i+1}^{r_i}$) by a pseudo-random function, calculates $T_i$ by an exclusive OR of $K_i^{(l)}$ and $K_i^{(r)}$, randomly selects $T'_i \in_R Z_p^2$, generates a signature $\sigma_i \leftarrow (\Sigma_{j=1,\ldots,L} SMPK_j, \Sigma_{j=1,\ldots,L} sk_i^{(j)}, (R, R_i, c_i, k_i, s_i, T_i, T'_i))$ from a master public key $\Sigma_{j=1,\ldots,L} SMPK_j$, a signature key $\Sigma_{j=1,\ldots,L} sk_i^{(j)}$, and a message $(R, R_i, c_i, k_i, s_i, T_i, T'_i)$, and generates a key of a second type $(k_i, s_i, T_i, T'_i, \sigma_i)$, for $i=1$, a communication device $U_1$ calculates a session ID sid from $c_k$ ($1 \leq k \leq n$) by a target-collision resistant hash function, calculates $K_1^{(l)}$ using (sid, $R_n^{r_1}$) by a pseudo-random function, calculates $K_1^{(r)}$ using (sid, $R_2^{r_1}$) by a pseudo-random function, calculates $T_1$ by an exclusive OR of $K_1^{(l)}$ and $K_1^{(r)}$, calculates T by an exclusive OR of $K_1^{(l)}$ and $k_1 \| s_1$, randomly selects $k''_1, s''_1 \in_R Z_p$, generates a signature $\sigma_1 \leftarrow (\Sigma_{j=1,\ldots,L} SMPK_j, \Sigma_{j=1,\ldots,L} sk_1^{(j)}, (R, R_1, c_1, k''_1, s''_1, T_1, T'))$ from the master public key $\Sigma_{j=1,\ldots,L} SMPK_j$, a signature key $\Sigma_{j=1,\ldots,L} sk_1^{(j)}$, and a message $(R, R_1, c_1, k''_1, s''_1, T_1, T')$, and generates a key of the second type $(k''_1, s''_1, T_1, T', \sigma_1)$, and for $i \in \{n+1, \ldots, N\}$, the communication device $U_i$ randomly selects $k_i, s_i \in_R Z_p$, $T_i$, $T'_i \in_R Z_p^2$, and $\sigma_i \in_R \Sigma$ (where $\Sigma$ is a signature space) and generates the key of the second type $(k_i, s_i, T_i, T'_i, \sigma_i)$, a second anonymous broadcast step in which for $i \in \{2, \ldots, n\}$, the communication device $U_i$ anonymously broadcasts, over the network, the key of the second type $(k_i, s_i, T_i, T'_i, \sigma_i)$ with the set $R-\{U_i\}$ being designated, by transmitting cipher text $C'_i$ generated from the key of the second type $(k_i, s_i, T_i, T'_i, \sigma_i)$ to the mix-net server, the mix-net server outputs shuffled cipher text of $\{C'_1, \ldots, C'_N\}$ to the release server that releases the shuffled cipher text of $\{C'_1, \ldots, C'_N\}$ as an output message, on the bulletin board, for $i=1$, the communication device $U_1$ anonymously broadcasts, over the network, the key of the second type $(k''_1, s''_1, T_1, T', \sigma_1)$ with a set $R-\{U_1\}$ being designated, by transmitting cipher text $C'_i$ generated from the key of the second type $(k''_1, s''_1, T_1, T', \sigma_1)$ to the mix-net server, the mix-net server outputs shuffled cipher text of $\{C'_1, \ldots, C'_N\}$ to the release server that releases the shuffled cipher text of $\{C'_1, \ldots, C'_N\}$ as an output message, on the bulletin board, and for $i \in \{n+1, \ldots, N\}$, the communication device $U_i$ anonymously, over the network, broadcasts the key of the second type $(k_i, s_i, T_i, T'_i, \sigma_i)$ with the φ being designated, by transmitting cipher text $C'_i$ generated from the key of the second type $(k_i, s_i, T_i, T'_i, \sigma_i)$ to the mix-net server, the mix-net server outputs shuffled cipher text of $\{C'_1, \ldots, C'_N\}$) to the release server that releases the shuffled cipher text of $\{C'_1, \ldots, C'_N\}$ as an output message, on the bulletin board, and a session key generation step in which for $i \in \{2, \ldots, n\}$, when the communication device $U_i$ obtains the key of the second type $(k''_1, s''_1, T_1, T', \sigma_1)$ and the key of the second type $(k_k, s_k, T_k, T', \sigma_k)$ ($2 \leq k \leq n$, $k \neq i$), the communication device $U_i$ generates a verification result $Ver_k \leftarrow (\Sigma_{j=1,\ldots,L} SMPK_j, ID_k, (R, R_k, c_k, k_k, s_k, T_k, T'_k), \sigma_k)$ from the master public key $\Sigma_{j=1,\ldots,L} SMPK_j$, a message $(R, R_k, c_k, k_k, S_k, T_k, T'_k)$, and a signature $\sigma_k$, if the signature $\sigma_k$ is successfully verified, calculates $K_1^{(l)}$ by an exclusive OR of $K_i^{(l)}$ and an exclusive OR of $T_j$ ($1 \leq j \leq i-1$), calculates $k_1 \| s_1$ by an exclusive OR of T' and $K_1^{(l)}$, and, if $c_k = g^{k_k} h^{s_k}$ holds for k that satisfies $1 \leq k \leq n$, generates the session key SK using the sid and an exclusive OR of the $k_i$ ($1 \leq i \leq n$) by a pseudo-random function, and for i=1, when the communication device $U_1$ obtains the key of the second type ($k_k$, $s_k$, $T_k$, $T'_k$, $\sigma_k$) ($2 \leq k \leq n$), the communication device $U_1$ generates a verification result $Ver_k \leftarrow (\Sigma_{j=1,\ldots,L}SMPK_j, ID_k, (R, R_k, c_k, k_k, s_k, T_k, T'_k), \sigma_k)$ from the master public key $\Sigma_{j=1,\ldots,L}SMPK_j$, a message $(R, R_k, c_k, k_k, s_k, T_k, T'_k)$, and a signature $\sigma_k$ and, if the signature $\sigma_k$ is successfully verified and $c_k = g^{k_k} h^{s_k}$ holds for k that satisfies $1 \leq k \leq n$, generates the session key SK using the sid and an exclusive OR of the $k_i$ ($1 \leq i \leq n$) by a pseudo-random function.

2. A key exchange system, comprising:

N communication devices $U_1, \ldots, U_N$, wherein

N is assumed to be an integer greater than or equal to 2 and L is assumed to be an integer greater than or equal to 1, the key exchange system allows communication devices of the N communication devices $U_1, \ldots, U_N$, the communication devices included in a set R of communication devices={$U_1, \ldots, U_n$} ($2 \leq n \leq N$), to share a session key SK over a network, $ID_i$ ($1 \leq i \leq N$) is assumed to be an identifier of a communication device $U_i$, $MPK_j$ ($1 \leq j \leq L$) is assumed to be a master public key of an anonymous ID-based broadcast encryption scheme, $SMPK_j$ ($1 \leq j \leq L$) is assumed to be a master public key of an 1D-based signature scheme, $dk_i^{(j)}$ ($1 \leq i \leq N$, $1 \leq j \leq L$) is assumed to be a decryption key of the anonymous ID-based broadcast encryption scheme, $sk_i^{(j)}$ ($1 \leq i \leq N$, $1 \leq j \leq L$) is assumed to be a signature key of the ID-based signature scheme, G is assumed to be a finite cyclic group of prime number order p with generators g and h, and ∥ is assumed to be a concatenation operator, and the key exchange system comprising:

the N communication devices $U_1, \ldots, U_N$, wherein the communication device $U_i$ ($1 \leq i \leq N$) includes processing circuitry configured to implement a recording unit on which secret strings $st_i$ and $st'_i$ are recorded, a first key generation unit that calculates, for $i \in \{1, \ldots, n\}$, $r_i$, $k_i$, and $s_i$ using the secret strings $st_i$ and $st'_i$ by a twisted pseudo-random function and generates a key of a first type $(R_i, c_i)$ by calculating $R_i = g^{r_i}$ and $c_i = g^{k_i} h^{s_i}$, and randomly selects, for $i \in \{n+1, \ldots, N\}$, $R_i$, $c_i \in_R G$ and generates a key of the first type $(R_i, c_i)$, a first anonymous broadcast unit that anonymously broadcasts, over the network, for $i \in \{1, \ldots, n\}$, the key of the first type $(R_i, c_i)$ with a set $R-\{U_i\}$ being designated, by transmitting cipher text $C_i$ generated from the key of the first type $(R_i, c_i)$ to a mix-net server, the mix-net server outputs shuffled cipher text of $\{C_1, \ldots, C_N\}$ to a release server that releases the shuffled cipher text of $\{C_1, \ldots, C_N\}$ as an output message, on a bulletin board, and anonymously broadcasts, over the network, for $i \in \{n+1, \ldots, N\}$, the key of the first type $(R_i, c_i)$ with φ, which means no recipient, being designated by transmitting cipher text $C_i$ generated from the key of the first type $(R_i, c_i)$ to the mix-net server, the mix-net server outputs shuffled cipher text of $\{C_1, \ldots, C_N\}$ to the release server that releases the shuffled cipher text of $\{C_1, \ldots, C_N\}$ as an output message, on the bulletin board, a second key generation unit that calculates, for $i \in \{2, \ldots, n\}$, a session ID sid using $c_k$ ($1 \leq k \leq n$) by a target-collision resistant hash function, calculates $K_i^{(l)}$ using (sid, $R_{i-1}^{r_{-i}}$) by a pseudo-random function, calculates $K_i^{(r)}$ using (sid, $R_{i+1}^{r_{-i}}$) by a pseudo-random function, calculates $T_i$ by an exclusive OR of $K_i^{(l)}$ and $K_i^{(r)}$, randomly selects $T'_i \in_R Z_p^2$, generates a signature $\sigma_i \leftarrow (\Sigma_{j=1,\ldots,L}SMPK_j, \Sigma_{j=1,\ldots,L}sk_i^{(j)}, (R, R_i, c_i, k_i, s_i, T_i, T'_i))$ from a master public key $\Sigma_{j=1,\ldots,L}SMPK_j$, a signature key $\Sigma_{j=1,\ldots,L}sk_i^{(j)}$, and a message $(R, R_i, c_i, k_i, s_i, T_i, T'_i)$, and generates a key of a second type $(k_i, s_i, T_i, T'_i, \sigma_i)$, calculates, for i=1, a session ID sid from $c_k$ ($1 \leq k \leq n$) by a target-collision resistant hash function, calculates $K_1^{(l)}$ using (sid, $R_n^{r_{-1}}$) by a pseudo-random function, calculates $K_1^{(r)}$ using (sid, $R_2^{r_{-1}}$) by a pseudo-random function, calculates $T_1$ by an exclusive OR of $K_1^{(l)}$ and $K_1^{(r)}$, calculates T' by an exclusive OR of $K_1^{(l)}$ and $k_1 \| s_1$, randomly selects $k''_1, s''_1 \in_R Z_p$, generates a signature $\sigma_1 \leftarrow (\Sigma_{j=1,\ldots,L}SMPK_j, \Sigma_{j=1,\ldots,L}sk_1^{(j)}, (R, R_1, c_1, k''_1, s''_1, T_1, T'))$ from the master public key $\Sigma_{j=1,\ldots,L}SMPK_j$, a signature key $\Sigma_{j=1,\ldots,L}sk_1^{(j)}$, and a message $(R, R_1, c_1, k''_1, s''_1, T_1, T')$, and generates a key of the second type $(k''_1, s''_1, T_1, T', \sigma_1)$, and randomly selects, for $i \in \{n+1, \ldots, N\}$, $k_i$, $s_i \in_R Z_p$, $T_i$, $T'_i \in_R Z_p^2$, and $\sigma_i \in_R \Sigma$ (where Σ is a signature space) and generates the key of the second type $(k_i, s_i, T_i, T'_i, \sigma_i)$, a second anonymous broadcast unit that anonymously broadcasts, over the network, for $i \in \{2, \ldots, n\}$, the key of the second type $(k_i, s_i, T_i, T'_i, \sigma_i)$ with the set $R-\{U_i\}$ being designated by transmitting cipher text $C'_i$ generated from the key of the second type $(k_i, s_i, T_i, T'_i, \sigma_i)$ to the mix-net server, the mix-net server outputs shuffled cipher text of $\{C'_1, \ldots, C'_N\}$ to the release server that releases the shuffled cipher text of $\{C'_1, \ldots, C'_N\}$ as an output message, on the bulletin board, anonymously broadcasts, over the network, for i=1, the key of the second type $(k''_1, s''_1, T_1, T', \sigma_1)$ with a set $R-\{U_1\}$ being designated, by transmitting cipher text $C'_i$ generated from the key of the second type $(k''_1, s''_1, T_1, T', \sigma_1)$ to the mix-net server, the mix-net server outputs shuffled cipher text of $\{C'_1, \ldots, C'_N\}$ to the release server that releases the shuffled cipher text of $\{C'_1, \ldots, C'_N\}$ as an output message, on the bulletin board, and anonymously broadcasts, over the network, for $i \in \{n+1, \ldots, N\}$, the key of the second type $(k_i, s_i, T_i, T'_i, \sigma_i)$ with the φ being designated, by transmitting cipher text $C'_i$ generated from the key of the second type $(k_i, s_i, T_i, T'_i, \sigma_i)$ to the mix-net server, the mix-net server outputs shuffled cipher text of $\{C'_1, \ldots, C'_N\}$ to the release server that releases the shuffled cipher text of $\{C'_1, \ldots, C'_N\}$ as an output message, on the bulletin board, and a session key generation unit that generates, for $i \in \{2, \ldots, n\}$, when obtaining the key of the second type $(k''_1, s''_1, T_1, T', \sigma_1)$ and the key of the second type $(k_k, s_k, T_k, T'_k, \sigma_1)$ ($2 \leq k \leq n$, $k \neq i$), a verification result $Ver_k \leftarrow (\Sigma_{j=1,\ldots,L}SMPK_j, ID_k, (R, R_k, c_k, k_k, s_k, T_k, T'_k), \sigma_k)$ from the master public key $\Sigma_{j=1,\ldots,L}SMPK_j$, a message $(R, R_k, c_k, k_k, s_k, T_k, T'_k)$, and a signature $\sigma_k$, if the signature $\sigma_k$ is successfully verified, calculates $K_1^{(l)}$ by an exclusive OR of $K_i^{(l)}$ and an exclusive OR of $T_j$ ($1 \leq j \leq i-1$), calculates $k_1\|s_1$ by an exclusive OR of T' and $K_1^{(l)}$, and, if $c_k=g^{k_k}h^{s_k}$ holds for k that satisfies $1\leq k\leq n$, generates the session key SK using the sid and an exclusive OR of the $k_i(1\leq i\leq n)$ by a pseudo-random function, and generates, for i=1, when obtaining the key of the second type $(k_k, s_k, T_k, T'_k, \sigma_k)$ $(2\leq k\leq n)$, a verification result $Ver_k \leftarrow (\Sigma_{j=1,\ldots,L}SMPK_j, ID_k, (R, R_k, c_k, k_k, s_k, T_k, T'_k), \sigma_k)$ from the master public key $\Sigma_{j=1,\ldots,L}SMPK_j$, a message $(R, R_k, c_k, k_k, s_k, T_k, T'_k)$, and a signature $\sigma_k$ and, if the signature $\sigma_k$ is successfully verified and $c_k=g^{k_k}h^{s_k}$ holds for k that satisfies $1\leq k\leq n$, generates the session key SK using the sid and an exclusive OR of the $k_j$ $(1\leq i\leq n)$ by a pseudo-random function.

3. A communication device, as the communication device $U_i$ $(1\leq i\leq N)$, in the key exchange system according to claim 2.

4. A non-transitory computer readable medium that stores a program for making a computer function as communication device $U_i$ $(1\leq i\leq N)$, in a key exchange system comprising:

N communication devices $U_1, \ldots, U_N$, wherein

N is assumed to be an integer greater than or equal to 2 and L is assumed to be an integer greater than or equal to 1, the key exchange system allows communication devices of the N communication devices $U_1, \ldots, U_N$, the communication devices included in a set R of communication devices={$U_1, \ldots, U_n$} $(2\leq n\leq N)$, to share a session key SK over a network, $ID_i$ $(1\leq i\leq N)$ is assumed to be an identifier of a communication device $U_i$, $MPK_j$ $(1\leq j\leq L)$ is assumed to be a master public key of an anonymous ID-based broadcast encryption scheme, $SMPK_i$ $(1\leq j\leq L)$ is assumed to be a master public key of an ID-based signature scheme, $dk_i^{(j)}$ $(1\leq i\leq N, 1\leq i\leq L)$ is assumed to be a decryption key of the anonymous ID-based broadcast encryption scheme, $sk_i^{(j)}$ $(1\leq i\leq N, 1\leq j\leq L)$ is assumed to be a signature key of the ID-based signature scheme, G is assumed to be a finite cyclic group of prime number order p with generators g and h, and $\|$ is assumed to be a concatenation operator, and the key exchange system comprising:

the N communication devices $U_1, \ldots, U_N$, wherein the communication device $U_i$ $(1\leq i\leq N)$ includes processing circuitry configured to implement a recording unit on which secret strings $st_i$ and $st'_i$ are recorded, a first key generation unit that calculates, for $i\in\{1, \ldots, n\}$, $r_i$, $k_i$, and $s_i$ using the secret strings $st_i$ and $st'_i$ by a twisted pseudo-random function and generates a key of a first type $(R_i, c_i)$ by calculating $R_i=g^{r_i}$ and $c_i=g^{k_i}h^{s_i}$, and randomly selects, for $i\in\{n+1, \ldots, N\}$, $R_i, c_i\in_R G$ and generates a key of the first type $(R_i, c_i)$, a first anonymous broadcast unit that anonymously broadcasts, over the network, for $i\in\{1, \ldots, n\}$, the key of the first type $(R_i, c_i)$ with a set R-$\{U_i\}$ being designated, by transmitting cipher text $C_i$ generated from the key of the first type $(R_i, c_i)$ to a mix-net server, the mix-net server outputs shuffled cipher text of $\{C_1, \ldots, C_N\}$ to a release server that releases the shuffled cipher text of $\{C_1, \ldots, C_N\}$ as an output message, on a bulletin board, and anonymously broadcasts, over the network, for $i\in\{n+1, \ldots, N\}$, the key of the first type $(R_i, c_i)$ with $\varphi$, which means no recipient, being designated by transmitting cipher text $C_i$ generated from the key of the first type $(R_i, c_i)$ to the mix-net server, the mix-net server outputs shuffled cipher text of $\{C_1, \ldots, C_N\}$ to the release server that releases the shuffled cipher text of $\{C_1, \ldots, C_N\}$ as an output message, on the bulletin board, a second key generation unit that calculates, for $i\in\{2, \ldots, n\}$, a session ID sid using $c_k$ $(1\leq k\leq n)$ by a target-collision resistant hash function, calculates $K_i^{(l)}$ using $(sid, R_{i-1}^{r_i})$ by a pseudo-random function, calculates $K_i^{(r)}$ using $(sid, R_{i+1}^{r_i})$ by a pseudo-random function, calculates $T_i$ by an exclusive OR of $K_i^{(l)}$ and $K_i^{(r)}$, randomly selects $T'_i\in_R Z_p^2$, generates a signature $\sigma_i \leftarrow (\Sigma_{j=1,\ldots,L}SMPK_j, \Sigma_{j=1,\ldots,L}sk_i^{(j)}, (R, R_i, c_i, k_i, s_i, T_i, T'_i))$ from a master public key $\Sigma_{j=1,\ldots,L}SMPK_j$, a signature key $\Sigma_{j=1,\ldots,L}sk_i^{(j)}$, and a message $(R, R_i, c_i, k_i, s_i, T_i, T'_i)$, and generates a key of a second type $(k_i, s_i, T_i, T'_i, \sigma_i)$, calculates, for i=1, a session ID sid from $c_k$ $(1\leq k\leq n)$ by a target-collision resistant hash function, calculates $K_1^{(l)}$ using $(sid, R_n^{r_1})$ by a pseudo-random function, calculates $K_1^{(r)}$ using $(sid, R_2^{r_1})$ by a pseudo-random function, calculates $T_1$ by an exclusive OR of $K_1^{(l)}$ and $K_1^{(r)}$, calculates T' by an exclusive OR of $K_1^{(l)}$ and $k_1\|s_1$, randomly selects $k''_1, s''_1\in_R Z_p$, generates a signature $\sigma_1 \leftarrow (\Sigma_{j=1,\ldots,L}SMPK_j, \Sigma_{j=1,\ldots,L}sk_1^{(j)}, (R, R_1, \ldots c_1, k''_1, s''_1, T_1, T'))$ from the master public key $\Sigma_{j=1,\ldots,L}SMPK_j$, a signature key $\Sigma_{j=1,\ldots,L}sk_1^{(j)}$, and a message $(R, R_1, c_1, k''_1, s''_1, T_1, T')$, and generates a key of the second type $(k''_1, s''_1, T_1, T'_1, \sigma_1)$, and randomly selects, for $i\in\{n+1, \ldots, N\}$, $k_i, s_i\in_R Z_p$, $T_i, T'_i\in_R Z_n^2$, and $\sigma_i\in_R \Sigma$ (where $\Sigma$ is a signature space) and generates the key of the second type $(k_i, s_i, T_i, T'_i, \sigma_i)$, a second anonymous broadcast unit that anonymously broadcasts, over the network, for $i\in\{2, \ldots, n\}$, the key of the second type $(k_i, s_i, T_i, T'_i, \sigma_i)$ with the set R-$\{U_i\}$ being designated by transmitting cipher text $C'_i$ generated from the key of the second type $(k_i, s_i, T_i, T'_i, \sigma_i)$ to the mix-net server, the mix-net server outputs shuffled cipher text of $\{C'_1, \ldots, C'_N\}$ to the release server that releases the shuffled cipher text of $\{C'_1, \ldots, C'_N\}$ as an output message, on the bulletin board, anonymously broadcasts, over the network, for i=1, the key of the second type $(k''_1, s''_1, T_1, T', \sigma_1)$ with a set R-$\{U_1\}$ being designated, by transmitting cipher text $C'_i$ generated from the key of the second type $(k''_1, s''_1, T_1, T', \sigma_1)$ to the mix-net server, the mix-net server outputs shuffled cipher text of $\{C'_1, \ldots, C'_N\}$ to the release server that releases the shuffled cipher text of $\{C'_1, \ldots, C'_N\}$ as an output message, on the bulletin board, and anonymously broadcasts, over the network, for $i\in\{n+1, \ldots, N\}$, the key of the second type $(k_i, s_i, T_i, T'_i, \sigma_i)$ with the S being designated, by transmitting cipher text $C'_i$ generated from the key of the second type $(k_i, s_i, T_i, T'_i, \sigma_i)$ to the mix-net server, the mix-net server outputs shuffled cipher text of $\{C'_1, \ldots, C'_N\}$ to the release server that releases the shuffled cipher text of $\{C'_1, \ldots, C'_N\}$ as an output message, on the bulletin board, and a session key generation unit that generates, for $i \in \{2, \ldots, n\}$, when obtaining the key of the second type $(k''_1, s''_1, T_1, T', \sigma_1)$ and the key of the second type $(k_k, s_k, T_k, T'_k, \sigma_k)$ $(2 \leq k \leq n, k \neq i)$, a verification result $Ver_k \leftarrow (\Sigma_{j=1,\ldots,L}SMPK_j, ID_k, (R, R_k, c_k, k_k, s_k, T_k, T'_k), \sigma_k)$ from the master public key $\Sigma_{j=1,\ldots,L}SMPK_j$, a message $(R, R_k, c_k, k_k, s_k, T_k, T'_k)$, and a signature $\sigma_k$, if the signature $\sigma_k$ is successfully verified, calculates $K_1^{(I)}$ by an exclusive OR of $K_i^{(I)}$ and an exclusive OR of $T_j$ $(1 \leq j \leq i-1)$, calculates $k_1 \| s_1$ by an exclusive OR of $T'$ and $K_1^{(I)}$, and, if $c_k = g^{k\_k}h^{s\_k}$ holds for k that satisfies $1 \leq k \leq n$, generates the session key SK using the sid and an exclusive OR of the $k_i$ $(1 \leq i \leq n)$ by a pseudo-random function, and generates, for $i=1$, when obtaining the key of the second type $(k_k, s_k, T_k, T'_k, \sigma_k)$ $(2 \leq k \leq n)$, a verification result $Ver_k \leftarrow (\Sigma_{j=1,\ldots,L}SMPK_j, ID_k, (R, R_k, c_k, k_k, s_k, T_k, T'_k), \sigma_k)$ from the master public key $\Sigma_{j=1,\ldots,L}SMPK_j$, a message $(R, R_k, c_k, k_k, s_k, T_k, T'_k)$, and a signature $\sigma_k$ and, if the signature $\sigma_k$ is successfully verified and $c_k = g^{k\_k}h^{s\_k}$ holds for k that satisfies $1 \leq k \leq n$, generates the session key SK using the sid and an exclusive OR of the $k_i$ $(1 \leq i \leq n)$ by a pseudo-random function.

\* \* \* \* \*

UNITED STATES PATENT AND TRADEMARK OFFICE
CERTIFICATE OF CORRECTION

PATENT NO. : 12,034,862 B2  
APPLICATION NO. : 17/852745  
DATED : July 9, 2024  
INVENTOR(S) : Reo Yoshida et al.

Page 1 of 1

It is certified that error appears in the above-identified patent and that said Letters Patent is hereby corrected as shown below:

In the Claims

Column 16, Line 15, "calculates T by an exclusive OR of $K_1^{(l)}$ and $k_1 \| s_1$" should be changed to -- calculates T' by an exclusive OR of $K_1^{(l)}$ and $k_1 \| s_1$ --.

Column 16, Line 20, "and a message (R, $R_1$, $c_i$, $k''_1$, $s''_1$, $T_1$, T')" should be changed to -- and a message (R, $R_1$, $c_1$, $k''_1$, $s''_1$, $T_1$, T') --.

Column 16, Line 21, "and generates a key of the second type ($k''_1$, $s''_J$, $T_1$, T', $\sigma_1$)" should be changed to -- and generates a key of the second type ($k''_1$, $s''_1$, $T_1$, T', $\sigma_1$) --.

Column 18, Line 60, "and the key of the second type ($k_k$, $s_k$, $T_k$, $T'_k$, $\sigma_1$) ($2 \leq k \leq n$, $k \neq i$)" should be changed to -- and the key of the second type ($k_k$, $s_k$, $T_k$, $T'_k$, $\sigma_k$) ($2 \leq k \leq n$, $k \neq i$) --.

Column 20, Line 14, "calculates $T_1$ by an exclusive OR of $K_i^{(l)}$ and $K_i^{(r)}$" should be changed to -- calculates $T_i$ by an exclusive OR of $K_i^{(l)}$ and $K_i^{(r)}$ --.

Column 20, Line 30, "(R, $R_1$, ... $c_1$, $k''_1$, $s''_1$, $T_1$, T')" should be changed to -- (R, $R_1$, $c_1$, $k''_1$, $s''_1$, $T_1$, T') --.

Column 20, Line 36, "$T_i, T'_i \in {}_R Z_n^2$" should be changed to -- $T_i, T'_i \in {}_R Z_p^2$ --.

Column 20, Line 60, "the key of the second type ($k_i$, $s_i$, $T_i$, $T_i'$, $\sigma_i$) with the S" should be changed to -- the key of the second type ($k_i$, $s_i$, $T_i$, $T_i'$, $\sigma_i$) with the φ --.

Signed and Sealed this  
Seventeenth Day of September, 2024

Katherine Kelly Vidal  
*Director of the United States Patent and Trademark Office*